United States Patent [19]

Clubley et al.

[11] 4,248,976
[45] Feb. 3, 1981

[54] FLAME-RESISTANT POLYMER COMPOSITIONS

[75] Inventors: Brian G. Clubley, Sale; Boyce I. D. Davis, Cheadle; Thomas G. Hyde, Sale; Frank Lamb, Bury; Donald R. Randell, Stockport, all of England

[73] Assignee: Ciba-Geigy AG, Basel, Switzerland

[21] Appl. No.: 965,248

[22] Filed: Nov. 27, 1978

Related U.S. Application Data

[62] Division of Ser. No. 774,564, Mar. 4, 1977, Pat. No. 4,172,858.

[30] Foreign Application Priority Data

Mar. 6, 1976 [GB] United Kingdom ............... 9072/76
Aug. 7, 1976 [GB] United Kingdom ............. 32980/76

[51] Int. Cl.$^3$ ............................................. C08K 5/52
[52] U.S. Cl. ............................................ 525/2; 525/20; 260/45.7 R; 260/45.7 P; 260/45.7 PH; 260/45.85 R; 260/45.9 NP; 260/45.95 R; 260/45.95 L
[58] Field of Search ............... 260/45.95 R, 45.95 L, 260/45.7 RL, 45.7 P, 45.7 PH, 45.85 R; 525/2, 20

[56] References Cited

U.S. PATENT DOCUMENTS

| | | | |
|---|---|---|---|
| 2,631,768 | 3/1953 | Ross et al. | 260/45.7 RL |
| 3,400,085 | 9/1968 | Kujawa et al. | 521/107 |
| 3,582,510 | 6/1971 | Cannelongo | 260/28.5 |
| 3,658,634 | 4/1972 | Yanagi et al. | 260/45.7 PH |
| 3,899,466 | 8/1975 | Dubeck et al. | 260/45.7 RL |
| 3,901,834 | 8/1975 | Brackenridge | 260/45.7 RL |
| 3,981,936 | 9/1976 | Petersen et al. | 260/45.7 RL |
| 4,057,531 | 11/1977 | Dubeck et al. | 260/45.95 R |

*Primary Examiner*—V. P. Hoke
*Attorney, Agent, or Firm*—Wenderoth, Lind & Ponack

[57] ABSTRACT

Flameproofing of aromatic polymers is achieved by adding a synergistic combination of (a) a phosphorus compound and (b) a compound of formula R(CH$_2$X)$_n$, wherein R is an aromatic or heterocyclic residue, X is a leaving group and n is at least 2. Preferred phosphorus compounds are esters of phosphoric acid. The flameproofed polymers may contain aromatic groups in the main chain or as side-groups, for instance styrene polymers and copolymers, aromatic polyesters, polycarbonates and polyphenylene oxides.

27 Claims, No Drawings

FLAME-RESISTANT POLYMER COMPOSITIONS

This application is a division of application Ser. No. 774,564, filed Mar. 4, 1977 now U.S. Pat. No. 4,172,858.

The present invention relates to fire retardant compositions containing a significant amount of an aromatic polymer, including linear and crosslinked polymers, wherein the aromatic groups may be part of the polymer chain or may be side groups.

Traditionally such aromatic polymers are made flame retardant by adding to them flame retardants containing phosphorus, halogen, antimony or any combination of these. For example, chlorinated paraffins, chlorinated paraffin/antimony oxide mixtures and tris(2,3-dibromopropyl)phosphate have been used. Surprisingly, we have found that the fire retardant effect in such polymers of phosphorus compounds, in particular certain esters of phosphorus acids can be greatly improved by the use of certain supplemental additives. As a result, either a greater fire resistance can be achieved without increasing the phosphorus content of the polymer or the same fire resistance can be achieved with a lower phosphorus content.

Accordingly, the present invention provides compositions from a polymer containing aromatic groups in the polymer chain or as side groups, and a flame-retardant combination consisting of
(a) a phosphorus compound
(b) a compound of formula I $$R(CH_2X)_n \qquad I$$

in which R represents an aromatic hydrocarbon or heterocyclic residue, n is an integer of at least 2, and each X is the same or different and represents a leaving group.

In the compound of formula I, each aromatic or heterocyclic ring may bear from 0 to 6 —$CH_2X$ groups, preferably 1–3 and most preferably 1, provided that there are at least 2 —$CH_2X$ groups per molecule.

Thus n may be from 2 to 12, preferably from 2 to 6 and, most preferably, from 2 to 4.

The aromatic nucleus preferably has a free ortho position next to the —$CH_2X$ group and the $CH_2X$ group is preferably positioned so as not to allow intramolecular cyclisation.

Leaving group X in formula I is halogen, —OH, —SH, —$NH_2$, —$CO_2H$, —$PO_3H_2$, $OB(OH)_2$ and their derivatives, for example —$OR^1$, —$SR^1$, —$NHR^1$, —$NR^1R^2$, —$OB(OR^1)(OR^2)$. Non-limiting examples of such derivatives and other X groups may be represented by the general formulae —Y—C(W)—Z, —Y—P(L)($Y^1R^1$)($Y^2R^2$) or —Y—SO(M)—Z where Y, $Y^1$ and $Y^2$ are, independently, —O—, —NH—, —N($R^1$)—, —S—, or are absent, but preferably are —O— or —S— Z is H, $R^1$, $OR^1$, —$SR^1$, $NH_2$, $NHR^1$, $NR^1R^2$ or a direct bond linking C(W) back to R or to a $CH_2$ attached to R but preferably is H or $R^1$; W is O, S, NH or $NR^1$, but preferably is O or S; L is O, S or is absent, but preferably is O; M is O or is absent, but preferably is O; and wherein $R^1$ represents a straight or branched chain alkyl having 1 to 12 carbon atoms, preferably 1 to 4, but most preferably 1, alkenyl or alkynyl having 2 to 12 carbon atoms, preferably 2 to 4, cycloalkyl or cycloalkenyl having 5 to 12, preferably 6 carbon atoms, aralkyl, aralkenyl or alkaryl having 7 to 12 carbon atoms, preferably benzyl or naphthyl methyl or aryl having 6 to 15, preferably 6 to 12 carbon atoms, most preferably benzyl or naphthylmethyl. $R^1$ may be optionally substituted by one or more halogen, hydroxy, epoxy, nitrile, amine, amide, ether, carboxyl or ester groups or combinations thereof, but is preferably unsubstituted. $R^2$ has the same significance as $R^1$ and may be the same or different. The leaving group may also be a salt of an acidic or basic X group.

However compounds of formula I where X=OH or a derivative of this group are preferred.

The aromatic residues R may be mono-, di-, or polycyclic and these may be condensed or non-condensed. The non-condensed, di and poly-cyclic aromatic residues may be linked directly or through groups containing carbon or hetero atoms or groups containing combinations of carbon and hetero atoms. The compound of formula I may, therefore, be an oligomer containing the above mentioned aromatic hydrocarbon and heterocyclic residues formed by addition or condensation reactions.

Apart from the groups —$CH_2X$ and the mentioned linking groups the group R may be otherwise unsubstituted or it may be substituted by one or more halogen atoms or alkyl groups having 1 to 12 carbon atoms, preferably 1 to 4, cycloalkyl groups having 5 to 12 carbon atoms, hydroxyl groups, alkoxy groups having 1 to 12, preferably 1 to 4, carbon atoms which may contain an epoxide group, cycloalkoxy groups having 5 to 12 carbon atoms, aralkyloxy groups having 7 to 12 carbon atoms, acyloxy groups having 1 to 12, preferably 1 to 4, carbon atoms, carboxyl groups or carboalkoxy groups having 2 to 12, preferably 2 to 4, carbon atoms or mixtures thereof. However, R is preferably an otherwise unsubstituted or alkyl substituted di-, tri-, or tetracyclic residue.

In formula I non-limiting examples of residue R include those derived from the following systems:
where R is monocyclic
  1 benzene
  2 toluene
  3 xylenes
  4 ethyl benzene
  5 mesitylene
  6 durene
  7 isodurene
  8 ψ-cumene or cumene
  9 anisole
  10 phenyl acetate
  11 chlorobenzene
  12 bromobenzene
  13 pyridine
  14 triazine
  15 pyrimidine
  16 pyrazine
  17 p-t-butyl phenol
Preferably R is derived from residues 1–10 and 17.
where R is non-condensed bicyclic
  1 biphenyl
  2 diphenylmethane
  3 1:1-diphenylethane
  4 1:2-diphenylethane
  5 2:2-diphenylpropane
  6 diphenylcarbinol
  7 benzophenone
  8 phenyl benzoate
  9 diphenylacetic acid (and its esters)
  10 diphenylether
  11 diphenylacetonitrile
  12 diphenylsulphide 13 diphenyldisulphide
14 diphenylsulphoxide
15 diphenylsulphone
16 diphenylamine
17 N,N-diphenylmethylamine
18 diphenyl methyl phosphine
19 diphenyl methyl phosphine oxide
20 diphenyl octyl phosphate
21 dipyridyl
22 3,3′-dimethyl biphenyl
23 2,2′-dimethyl biphenyl
24 4,4′-dimethyl biphenyl
25 2,2′-diphenyl dicarboxylic acid
26 stilbene
27 benzoin
28 benzil
29 benzilic acid
30 dibenzyl sulphate
31 dibenzyl oxalate
32 dibenzyl succinate
33 diphenyl carbonate
34 octyl di-styryl phosphinate
35 ferrocene
36 diphenyl succinate
37 1,2-diphenoxy ethane Of these we prefer residues derived from Nos. 1, 2, 10 and 15.

where R is condensed bicyclic
1 naphthalene
2 methyl naphthalene
3 methoxy naphthalene
4 tetralin
5 quinoline
6 isoquinoline
7 quinoxaline
8 quinazoline
9 phthalazine
10 phthalimide
11 indole
12 benzofuran
13 benzimidazole
14 benzothiazole
15 benzotriazole Of these we prefer naphthalene and methyl naphthalene.

where R is non-condensed tricyclic
1 terphenyl
2 triphenyl methane
3 dibenzyl benzene
4 O,O¹-diphenyl hydroquinone
5 O,O¹-diphenyl resorcinol
6 triphenylamine
7 triphenyl phosphine
8 triphenyl phosphine oxide
9 triphenyl phosphate
10 tricresyl phosphate
11 trixylyl phosphate
12 isopropyl phenyl/phenyl phosphates, e.g. phosphates from isopropylated phenol sold under the trade names Reofos 30, 60 and 95.
13 triphenyl antimony
14 tribenzyl phosphate
15 diphenyl styryl phosphonate
16 triphenyl orthoformate Of these we prefer residues derived from Nos. 1, 2, 3, 5, 6, 8, 9, 10, 11 and 12.

where R is condensed tricyclic
1 anthracene
2 phenanthrene
3 phenyl naphthalene
4 acenaphthene
5 acenaphthylene
6 dihydroanthracene
7 anthrene
8 xanthene
9 xanthone
10 fluorene
11 fluorenone
12 acridine
13 phenanthridine
14 phenazine
15 benzocinnoline
16 carbazole
17 dibenzofuran
18 dibenzothiophene
19 phenothiazine
20 phenoxazine
21 α-methylstyrene dimer
22 styrene dimer
23 biphenylene
24 1-methylanthracene Of these we prefer residues derived from Nos. 1, 2, 3, 4, 5, 10, 16, 17, 21, 22 and 24.

where R is non-condensed tetracyclic
1 quaterphenyl
2 tetraphenylmethane
3 triphenyl benzene
4 2,4,6-triphenyl triazine
5 N,N¹N¹¹-triphenyl melamine
6 N,N¹N¹¹-triphenyl isocyanuric acid
7 tetraphenyl tin
8 tetraphenyl lead
9 tetraphenyl ethane
10 tetrabenzyl orthosilicate
11 2,4,6 triphenoxy triazine
12 tetraphenyl silicate Of these we prefer residues derived from Nos. 2, 4, 5, 6 and 11.

where R is condensed tetracyclic
1 dinaphthyl
2 phenyl anthracene
3 phenyl phenanthrene
4 N-phenyl acridone
5 N-phenyl carbazole
6 N-phenyl phenothiazine
7 N-phenyl phenoxazine
8 9-phenyl acridine
9 2:3-diphenyl quinoxaline
10 triphenylene
11 aceanthrene
12 pyrene
13 naphthacene
14 fluoranthene
15 chrysene
16 dinaphthyl methane Of these we prefer residues derived from dinaphthyl and N-phenyl carbazole.

where R is polycyclic higher than tetracyclic
1 9,10-diphenyl anthracene
2 sexiphenyl
3 rubrene
4 9,9-diphenyl xanthene
5 9,9-diphenyl acridane
6 hexacene
7 hexaphene
8 pyranthrene In formula I non limiting examples of group X are: chloro, bromo, hydroxyl, methoxy, ethoxy, butyloxy, cycloalkyloxy, benzyloxy, phenoxy, formyloxy, acetyloxy, benzoyloxy, carbamoyloxy, N-methylcarbamoyloxy, N,N-dimethylcarbamoyloxy, N-methylthiocarbamoyloxy, N,N-dimethylthiocarbamoyloxy, N-phenylcarbamoyloxy, N-phenylthiocarbamoyloxy, methylthio, acetylthio, thioacetylthio, methylamino, dimethylamino, acetylamino.

Non-limiting examples of particular compounds of structure I are
where R is monocyclic
    1,4-bis hydroxymethyl benzene
    1,4-bis methoxymethyl benzene
    1,4-bis benzoxymethyl benzene
    1,4-bis chloromethyl benzene
    1,4-bis acetyloxymethyl benzene
    2,4,6-tris chloromethyl mesitylene
    3,6-bis methoxymethyl durene
    2,4,6-tris acetoxymethyl phenol
    2,6-bis hydroxymethylpyridine
    2,6-bis hydroxymethyl-4-t-butylphenol
    1,3,5-tris hydroxymethyl benzene
    1,4-bis hydroxymethyl-2,3,5,6 tetrachlorobenzene
where R is non-condensed bicyclic
    4,4$^1$-bis(chloromethyl)biphenyl
    4,4$^1$-bis(bromomethyl)biphenyl
    4,4$^1$-bis(hydroxymethyl)biphenyl
    4,4$^1$-bis(methoxymethyl)biphenyl
    4,4$^1$-bis(phenyloxymethyl)biphenyl
    4,4$^1$-bis(benzyloxymethyl)biphenyl
    4,4$^1$-bis(acetyloxymethyl)biphenyl
    4,4$^1$-bis(formyloxymethyl)biphenyl
    4-hydroxymethyl-4$^1$-methoxymethyl biphenyl
    4-hydroxymethyl-4$^1$-acetoxymethyl biphenyl
    4,4$^1$-bis(dimethylaminomethyl)biphenyl
    4,4$^1$-bis(methylcarbamoyloxymethyl)biphenyl
    2,4-bis(acetoxymethyl)-6-phenyl-phenol acetate
    4,4$^1$-bis(hydroxymethyl)diphenyl methane
    4,4$^1$-bis(methoxymethyl)diphenyl methane
    4,4$^1$-bis(benzyloxymethyl)diphenyl methane
    4,4$^1$-bis(formyloxymethyl)diphenyl methane
    4,4$^1$-bis(carbamoyloxymethyl)diphenyl methane
    3,3'-bis-(acetoxymethyl)-4,4'-bis-acetoxy-diphenylmethane
    4,4$^1$-bis(hydroxymethyl)benzophenone
    4,4$^1$-bis(hydroxymethyl)diphenyl ether
    4,4$^1$-bis(methoxymethyl)diphenyl ether
    4,4$^1$-bis(acetyloxymethyl)diphenyl ether
    4,4$^1$-bis(hydroxymethyl)diphenyl sulphone
    3,3'-bis-(acetoxymethyl)-4,4'-bis-acetoxy-di-phenyl-sulphone
    N,N-bis(4-hydroxymethyl phenyl)methylamine
    bis(4-hydroxymethyl phenyl)octyl phosphate
    4,4$^1$-bis(methoxymethyl)-3,3$^1$-dimethyl diphenyl
    2,2-bis-(3'acetoxymethyl-4'-acetoxy-phenyl)-propane
    bis-(3-(o-hydroxymethylphenoxy)-2-hydroxypropyl) ether of 1,4-butanediol
where R is condensed bicyclic
    1,4-bis(chloromethyl)naphthalene
    1,4-bis(hydroxymethyl)naphthalene
    1,4-bis(methoxymethyl)naphthalene
    1,5-bis(chloromethyl)naphthalene
    1,5-bis(hydroxymethyl)naphthalene
    1,5-bis(methoxymethyl)naphthalene
    1,5-bis(formyloxymethyl)naphthalene
    1-methyl-bis-(chloromethyl)naphthalene
    2-methyl-bis-(chloromethyl)naphthalene
    1-methyl-bis-(hydroxymethyl)naphthalene
    2-methyl-bis-(hydroxymethyl)naphthalene
    1-methyl-bis(methoxymethyl)naphthalene
    2-methyl-bis(methoxymethyl)naphthalene
    5,8-bis(chloromethyl)tetralin
    5,8-bis(hydroxymethyl)tetralin
    5,8-bis(methoxymethyl)tetralin
    4,8-bis(chloromethyl)quinoline
    5,8-bis(hydroxymethyl)quinoline
    4,8-bis(methoxymethyl)quinoline
    4,8-bis(hydroxymethyl)isoquinoline
    4,8-bis(acetoxymethyl)isoquinoline
    5,8-bis(chloromethyl)quinoxaline
    5,8-bis(hydroxymethyl)quinoxaline
    5,8-bis(formyloxymethyl)quinoxaline
    5,8-bis(chloromethyl)phthalazine
    3,6-bis(chloromethyl)phthalimide
    4,7-bis(hydroxymethyl)indole
    4,7-bis(methoxymethyl)indole
    4,7-bis(hydroxymethyl)benzofuran
    4,7-bis(methoxymethyl)benzofuran
    4,7-bis(chloromethyl)benzofuran
    4,7-bis(hydroxymethyl)benzotriazole
    4,7(formyloxymethyl)benzotriazole
where R is non-condensed tricyclic
    1,4-di(p-chloromethyl phenyl)benzene
    1,4-di(p-hydroxymethyl phenyl)benzene
    1,4-di(p-formyloxymethyl phenyl)benzene
    tri(p-methoxymethyl phenyl)methane
    tri(p-hydroxymethyl phenyl)methane
    tri(p-chloromethyl phenyl)methane
    1,4-di(p-methoxymethyl benzyl)benzene
    1,4-di(p-hydroxymethyl benzyl)benzene
    1,4-di(p-formyloxymethyl benzyl)benzene
    1,4-di(p-chloromethyl benzyl)benzene
    1,4-di(p-acetoxymethyl benzyl)benzene
    O,O$^1$di(p-chloromethyl phenyl)hydroquinone
    O,O$^1$di(p-methoxymethyl phenyl)hydroquinone
    O,O$^1$di(p-benzoyloxymethyl phenyl)hydroquinone
    O,O$^1$di(p-dimethyl aminomethyl phenyl)resorcinol
    tri(p-hydroxymethyl phenyl)amine
    tri(p-methoxymethyl phenyl)amine
    tri(p-formyloxymethyl phenyl)phosphine
    tri(p-benzoyloxymethyl phenyl)phosphine
    tri(p-carbamoyloxymethyl phenyl)phosphine
    tri(p-dimethylaminomethyl phenyl)phosphine oxide
    tri(p-bromomethyl phenyl)phosphine oxide
    tri(p-benzoyloxymethyl phenyl)phosphine oxide
    tri(p-chloromethyl phenyl)phosphate
    tri(p-methoxymethyl phenyl)phosphate
    di(p-hydroxymethyl phenyl)mono(p-methoxymethyl phenyl)phosphate
    tri(p-methoxymethyl-meta-cresyl)phosphate
    mono-phenyl di(p-methoxymethyl phenyl)phosphate
    mono-phenyl,mono(p-hydroxymethyl phenyl), mono(p-methoxymethyl phenyl) phosphate
    di(methoxymethyl phenyl), mono(o-isopropyl phenyl)phosphate
    di(hydroxymethyl phenyl), mono(p-isopropyl phenyl)phosphate
    tris(2,4-dibutoxymethyl-6-phenyl-phenyl)borate
where R is condensed tricyclic
    1,4-di-hydroxymethyl anthracene
    5-hydroxymethyl-1,4-di(methoxymethyl)anthracene
    1,4-di-(hydroxymethyl)-5,8-di(methoxymethyl)anthracene
    2,7-di(acetoxymethyl)anthracene 1,4,7-tris(acetoxymethyl)acenaphthylene
1,4,7-tris(dimethylaminomethyl)acenaphthylene
1,4,5,8-tetra(hydroxymethyl)fluorene
1,4,5,8-tetra(acetoxymethyl)xanthene
1,4,5-tri(bromomethyl)xanthene
1,4,5,8-tetra(dimethylaminomethyl)carbazole
1,4,5,8-tetra(carbamoyloxymethyl)acridine
1,4,6,9-tetra(benzoyloxymethyl)phenazine
2,7,10-tris(chloromethyl)phenanthridine
1,4,6,9-tetra(methoxymethyl)phenoxazine
1,4,6,9-tetra(hydroxymethyl)phenothiazine
1,3,3-tri-methyl-1-phenyl-4,7-di(methoxymethyl)indane where R is non-condensed tetracyclic
tetra(3,5-di-hydroxymethyl phenyl)methane
tetra(4-methoxymethyl phenyl)methane
tetra(4-formyloxymethyl phenyl)methane
tetra(4-dimethylaminomethyl phenyl)methane
1,3,5-tri(3,5-di-chloromethyl phenyl)benzene
1,3,5-tri(4-methoxymethyl phenyl)benzene
1,3,5-tri(4-carbamoyloxymethyl phenyl)benzene
1,3,5-tri(4-benzoyloxymethyl phenyl)benzene
N,N$^1$,N$^{11}$-tri(3,5-di-hydroxymethyl phenyl)melamine
N,N$^1$,N$^{11}$-tri(3,5-di-formyloxymethyl phenyl)melamine
N,N$^1$,N$^{11}$-tri(4-methoxymethyl phenyl)melamine
2,4,6-tri(3,5-di-chloromethyl phenyl)triazine
2,4,6-tri(3,5-di-carbamoyloxymethyl phenyl)triazine
2,4,6-tri(4-acetoxymethyl phenyl)triazine
N,N$^1$,N$^{11}$-tri(3,5-dihydroxymethyl phenyl)isocyanurate
tetra(3,5-diformyloxymethyl phenyl)tin
tetra(4-hydroxymethyl phenyl)tin
tetra(4-chloromethyl phenyl)tin
tetra(4-acetoxymethyl phenyl)lead
tetra(4-bromoethyl phenyl)lead
tetra(4-methoxymethyl phenyl)lead
tetrakis-(2-butoxymethyl-phenyl)silicate where R is condensed tetracyclic
2-phenyl-5,8-di-bromomethyl anthracene
2-phenyl-5,8-di-hydroxymethyl anthracene
2-phenyl-5,8-di-formyloxymethyl anthracene
3-phenyl-3,6-dimethoxymethyl phenanthrene
3-phenyl-3,6-di-acetoxymethyl phenanthrene
3-phenyl-3,6-di-hydroxymethyl phenanthrene
N-phenyl-2,6-di-chloromethyl carbazole
N-phenyl-2,6-di-carbamoyloxymethyl carbazole
N-phenyl-2,7-di-methoxymethyl phenothiazine
N-phenyl-2,4,6-tri-bromomethyl phenothiazine
N-phenyl-2,4,6-tri-acetoxymethyl phenoxazine
2,3-diphenyl-5,8-di-formyloxymethyl quinoxaline
2,3-diphenyl-5,8-di-hydroxymethyl quinoxaline where R is polycyclic higher than tetracyclic
2,6-di-methoxymethyl-9,10-diphenyl anthracene
2,8-di-chloromethyl rubrene
2,6-di-hydroxymethyl-9,9-diphenyl xanthene
2,6-di-acetoxymethyl-9,9-diphenyl xanthene
2,6-di-carbamoyloxymethyl-9,9-diphenyl xanthene
1,4,6,9,12,15-hexa-methoxymethyl hexacene
poly(4,4'-dibenzyl)phthalate
poly ethylenedioxy(4,4'-dibenzyl)

When the compounds of formula I are oligomers, they have the general formula:

$$(A)_a(-CH_2-)_b[-CH_2(OCH_2)_mOCH_2-]_c-(-CH_2X)_d \quad \text{II}$$

wherein A is at least one aromatic hydrocarbon or heterocyclic residue, X is as defined above, a is 2 to 20 but equals b+c+1, b is 0 to 19, c is 0 to 19, d is 0 to 2a and m is 0 to 10, preferably 0–5, most preferably 0, there being at least two of the groups (CH$_2$X) and (—CH$_2$OCH$_2$—) per molecule.

It should be noted that the values of a, b, c, d and n are average values for the average molecule of formula II.

Examples of aromatic residues A are those derived from benzene, naphthalene, furan, anthracene, biphenyl and diphenyl ether. The aromatic residue A may be unsubstituted or substituted by one or two substituents. It is preferably unsubstituted, but if it is substituted it preferably carries only one substituent. Suitable substituents include halogen, alkyl groups with 1 to 4 carbon atoms, haloalkyl groups with 2 to 4 carbon atoms, hydroxyl, alkoxy with 1 to 4 carbon atoms or acyloxy with 2 to 4 carbon atoms.

The compounds represented by formula II are mixtures of oligomers with a range of molecular weights. The residues A are linked by (—CH$_2$—) or [—CH$_2$(OCH$_2$)$_m$OCH$_2$—] groups, these two linking groups being connected only to a residue A and not to each other. The groups (—CH$_2$X) are connected to a residue A.

Preferably more than 50 mol % of residues A are derived from naphthalene; most preferably more than 75 mol % of residues A are derived from naphthalene.

Oligomers which are preferred are those having a number average weight of 300 to 3500, more preferably those having a number average molecular weight of 350–1500, most preferably 400 to 1000. It is preferred that the naphthalene residue are linked by (—CH$_2$OCH$_2$—) and that these links should be attached to the positions 1,4; 1,5; 1,6; 1,7; 2,5; 2,6 or 2,7 on the naphthalene residue. It is most preferred that the links should be attached to the 1,4 or 1,5 positions on the naphthalene residue.

Non-limiting examples of particular oligomers of structure II are those linked by the group —CH$_2$OCH$_2$— and having two or more —CH$_2$X groups per molecule. Preferred structures which can be present as a component of the oligomer mixture are shown by the following formulae:

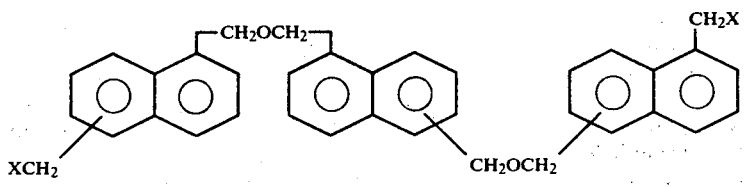

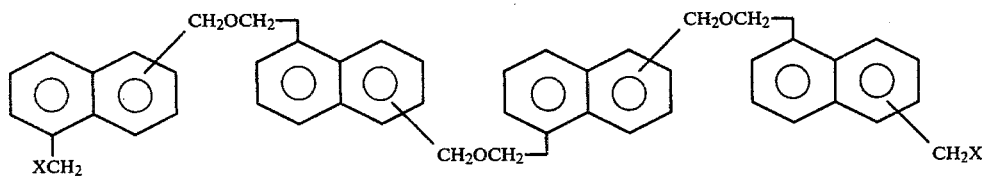

where X is —OH, —OCOCH₃, —OCH₂C₆H₅ or —OC₆H₅.

Specific Examples of oligomers which can be present as components of the oligomer mixture are listed in Table A

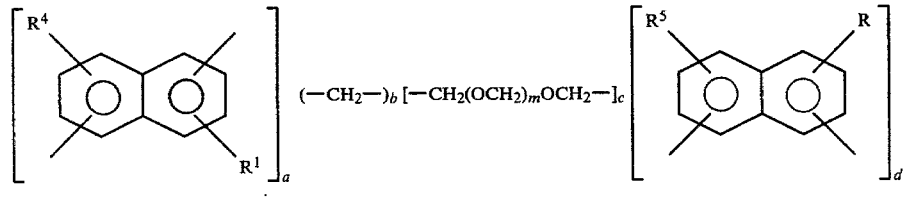

50, and prepared as described in U.K. Patent Specification No. 1,146,173).
7 phenyl/secbutyl phenyl phosphate
8 phenyl/p-t-butyl phenyl phosphate
9 di (o-cumyl phenyl) phenyl phosphate Table A

| No. | a | b | c | m | d | $R^4$ | $R^1$ | $R^5$ | R |
|-----|---|---|---|---|---|-------|-------|-------|---|
| 1 | 0 | 0 | 1 | 0 | 2 | — | — | — | —CH₂OH |
| 2 | 1 | 1 | 1 | 0 | 2 | — | — | — | —CH₂OCH₃ |
| 3 | 2 | 1 | 2 | 0 | 2 | —CH₃ | — | CH₃ | —CH₂OH |
| 4 | 3 | 2 | 2 | 0 | 2 | —CH₂Br | — | —CH₂Br | —CH₂OH |
| 5 | 4 | 1 | 4 | 0 | 2 | —CH₃ | — | CH₃ | —CH₂OCH₃ |
| 6 | 5 | 1 | 5 | 0 | 2 | — | — | — | —CH₂OC(O)CH₃ |
| 7 | 6 | 2 | 5 | 3 | 2 | — | — | — | —CH₂OH |
| 8 | 7 | 2 | 6 | 0 | 2 | CH₃ | CH₃ | CH₃ | —CH₂OC(O)CH₃ |
| 9 | 8 | 1 | 8 | 0 | 2 | — | — | — | —CH₂OCH₂C₆H₅ |
| 10 | 9 | 2 | 8 | 0 | 2 | CH₃ | CH₃ | CH₃ | —CH₂OC₆H₅ |
| 11 | 10 | 4 | 7 | 5 | 2 | — | — | — | —CH₂OH |
| 12 | 11 | 5 | 7 | 0 | 2 | Br | Br | Br | —CH₂Br |
| 13 | 12 | 3 | 10 | 0 | 2 | — | — | — | —CH₂OCH₂C₆H₅ |
| 14 | 13 | 4 | 10 | 0 | 2 | CH₃ | CH₃ | CH₃ | —CH₂OC(O)CH₃ |
| 15 | 14 | 3 | 12 | 0 | 2 | — | — | — | —CH₂OH |
| 16 | 5 | 1 | 5 | 6 | 2 | — | — | — | —CH₂OH |
| 17 | 15 | 0 | 16 | 0 | 2 | — | — | — | —CH₂OC(O)CH₃ |
| 18 | 16 | 0 | 17 | 0 | 2 | — | — | — | —CH₂OCH₂C₆H₅ |
| 19 | 17 | 9 | 9 | 0 | 2 | — | — | — | —CH₂OH |
| 20 | 1 | 0 | 2 | 0 | 2 | — | — | — | —CH₂OH |

The phosphorus compounds (a) include phosphine oxides and derivatives or salts of phosphorus acids. The derivatives and salts of phosphorus acids are preferred, the esters of phosphorus acids being more preferred and esters of pentavalent phosphorus, in particular phosphoric acid, are most preferred.

The phosphorus acids include derivatives of phosphoric acid, phosphonic acid, phosphinic acid, phosphorous acid or their dehydration products and their alkali metal, ammonium or amine salts. The acid groups in partial esters may be present as free acid groups, but preferably as their salts, e.g. as alkali metal or ammonium salts.

Non limiting examples of the phosphorus esters based on phosphoric acid are:
1 triphenyl phosphate
2 cresyl diphenyl phosphate
3 phenyl xylyl phosphate
4 tri-tolyl phosphate
5 tri-xylyl phosphate
6 phenyl/isopropyl phenyl phosphates (for example those sold under the trade name Reofos 95, 65 and
10 di (p-benzyl phenyl) phenyl phosphate
11 tri-(p-t-butyl phenyl) phosphate
12 tri-(p-nonyl phenyl) phosphate
13 tri-(p-t-amyl phenyl) phosphate
14 tri-(p-chlorophenyl) phosphate
15 tri-[o-(bromo isopropyl) phenyl] phosphate
16 tri-[p-(bromo isopropyl) phenyl] phosphate
17 diphenyl hydrogen phosphate
18 di(o-isopropylphenyl) hydrogen phosphate
19 phenyl di-hydrogen phosphate di-sodium salt
20 diphenyl hydrogen phosphate sodium salt
21 diphenyl 2-bromoethyl phosphate
22 diphenyl 2-chloroethyl phosphate
23 diphenyl 2,3-dibromopropyl phosphate
24 diphenyl 2,3-dichloropropyl phosphate
25 diphenyl n-octyl phosphate
26 diphenyl n-decyl phosphate
27 phenyl n-octyl hydrogen phosphate ammonium salt
28 phenyl 2,3-dibromopropyl phosphate potassium salt
29 phenyl di-(2-bromoethyl) phosphate
30 phenyl di-(2-chloroethyl) phosphate 31 phenyl di-(2,3-dichloropropyl) phosphate
32 phenyl di-(2,3-dibromopropyl) phosphate
33 phenyl di-n-octyl phosphate
34 phenyl di-n-decyl phosphate
35 di-n-decyl hydrogen phosphate
36 di-(2-bromoethyl) hydrogen phosphate sodium salt
37 2,3-bromopropyl methyl hydrogen phosphate
38 tri-(2-chloroethyl) phosphate
39 tri-(2-bromoethyl) phosphate
40 tri-(2,3 dibromopropyl) phosphate
41 tri-(2,3-dichloropropyl) phosphate
42 tri-octyl phosphate
43 tri-decyl phosphate
44 tri-allyl phosphate Non limiting examples of esters based on phosphonic acid are:

45 di-phenyl phenyl phosphonate
46 di-(p-bromophenyl) phenyl phosphonate
47 di-(p-t-butyl phenyl) phenyl phosphonate
48 di-(o-isopropyl phenyl) phenyl phosphonate
49 di-(p-benzyl phenyl) phenyl phosphonate
50 diphenyl styryl phosphonate
51 diphenyl 1,2-dibrom-2-phenylethyl phosphonate
52 diphenyl n-octyl phosphonate
53 diphenyl n-decyl phosphonate
54 di-(p-chlorophenyl) n-butyl phosphonate
55 di-(p-bromophenyl) n-hexyl phosphonate
56 di-(o-isopropyl phenyl) n-octyl phosphonate
57 phenyl n-octyl n-hexyl phosphonate
58 phenyl styryl hydrogen phosphonate or its sodium salt
59 di-phenyl hydrogen phosphonate
60 phenyl n-octyl phosphonate ammonium salt
61 bis-2,3-dibromopropyl 2,3-dibromo propyl phosphonate
62 N-hydroxymethyl 2-diethyl-phosphonopropionamide
63 N-diethylphosphonomethyl diethanol-amine Non limiting examples of esters based on phosphinic acid are:

64 n-octyl di-styryl phosphinate
65 n-octyl di-(1,2-dibromo-2-phenyl-ethyl) phosphinate
66 phenyl di-styryl phosphinate
67 n-octyl di-styryl phosphinate Non limiting examples of esters based on phosphorus acid are:

68 triphenyl phosphite
69 tri-octyl phosphite
70 tri(p-nonyl-phenyl)phosphite
71 tri(2:3-dibromopropyl)phosphite
72 diphenyl hydrogen phosphite
73 dioctyl hydrogen phosphite None limiting examples of phosphine oxides are:

74 triphenyl phosphine oxide
75 tris (o-isopropylphenyl) phosphine oxide
76 tris (p-t-butyl phenyl) phosphine oxide
77 tris (p-isopropyl phenyl) phosphine oxide
78 tris (p-cresyl phenyl) phosphine oxide
79 tris (m-cresyl phenyl) phosphine oxide Preferred compounds are the esters of pentavalent phosphorus and, more particularly, triaryl phosphates and trihaloalkyl phosphates, for example compounds 1 to 10 and 38 to 41.

It should be understood that where an ester of a phosphorus acid also has the formula $R(CH_2X)_n$, it is regarded as being a compound of the formula I and should be used in conjunction with another ester of a phosphorus acid which does not fit the formula $R(CH_2X)_n$. Except if another $R(CH_2X)_n$ component is present, then the phosphorus acid ester of formula $R(CH_2X)_n$ can be regarded as the ester component.

The compositions of the invention may contain the components (a) and (b) in the ratios a:b of 1:10 to 10:1, but preferably 1:1 to 8:1, and most preferably 2:1 to 4:1, by weight.

The amount of (a) together with (b) which can be used per hundred parts of polymer are from 1 to 100 parts, preferably 2–35 parts and, most preferably, 5 to 25 parts by weight. The actual amounts of (a) plus (b) used will vary depending on the particular polymer used and on the type and amount of other ingredients which may be present such as fillers and re-inforcing fibres (described hereinafter).

The aromatic polymers may be homo-polymers, co-polymers (the co-monomer being either aliphatic or aromatic), or polyblends with other polymers.

When the aromatic group is a side group of the polymer, the polymer preferably is a vinylaromatic polymer and more preferably it is a styrene based polymer. Non limiting examples of these polymers are polystyrene, poly-α-methyl styrene, polyvinyl toluenes, polychlorostyrenes or a co-polymer with other monomers. Non-limiting examples of co-polymers are styrene/α-methyl styrene, styrene/acrylonitrile, styrene/acrylates, styrene/methacrylates, acrylonitrile/butadiene/styrene, styrene/butadiene, styrene/ethylene, styrene/propylene, styrene/butene, methyl methacrylate/butadiene/styrene, styrene/fumaric acid, styrene/itaconic, styrene/maleic esters, styrene/vinyl esters of monobasic aliphatic acids, styrene/vinyl ethers of saturated monohydric alcohols, styrene/N-vinyl carbazole, styrene/acenaphthylene, styrene/sulphur dioxide, styrene/divinyl benzene.

Further examples are copolymers of styrene with unsaturated polymers, preferably polyesters. Such unsaturated polyesters usually are copolyesters of maleic acid or other unsaturated dicarboxylic acids and a saturated dicarboxylic acid, e.g. phthalic, adipic or sebacic acid with one or more glycols, e.g. ethylene, propylene, diethylene or butylene glycol. On copolymerisation with styrene a cross-linked polyester resin is formed. Other vinyl aromatic monomers may be used instead of styrene, such as α-methylstyrene or vinyltoluene, for curing unsaturated polyesters.

Preferred vinylaromatic polymers are polystyrene itself and its blends with a commercially available polymer, copolymers of styrene with butadiene or butadiene/acrylonitrile (i.e. ABS) or blends of these copolymers with commercial polymers. Non-limiting examples of vinylaromatic polyblends are polystyrene/PVC, polystyrene/polyphenylene oxide, styreneacrylonitrile co-polymer/polyphenylene oxide, polystyrene/polycarbonate, polystyrene/polysulphone.

Examples of graft copolymers of styrene are styrene/nitrile rubber, styrene/isoprene rubber, styrene/ethylenepropylene copolymer or styrene/ethylene-vinylacetate copolymer.

It should be understood that some of these polymers, e.g. styrene/butadiene can be subsequently cross-linked to form a rubbery polymer by conventional vulcanising agents such as sulphur.

If the polymer contains aromatic groups in the polymer chain, the polymer may be a thermoplastic polymer which contains hetero atoms in the polymer chain. Non-limiting examples of such polymers are polycarbonates, polyphenylene oxides, polysulphides, polysulphones, polysulphonates, polyamides, polyimides, polybenzimidazoles, linear polyesters, polyhydrazides, polyanhydrides and thermoplastic polyurethanes.

Non-limiting examples of the dihydric phenols from which polycarbonates used in the present invention can be prepared are:

2,2 bis-(4-hydroxyphenyl)-propane; hydroquinone; resorcinol;

2,2 bis-(4-hydroxyphenyl)-pentane; 2,4' dihydroxydiphenyl methane; bis-(2-hydroxyphenyl)-methane; bis-(4-hydroxyphenyl)-methane; bis-(4-hydroxy-5-nitrophenyl)-methane; 1,1 bis-(4-hydroxyphenyl)-ethane; 3,3 bis-(4-hydroxyphenyl)-pentane;

2,2'dihydroxydiphenyl, 2,6 dihydroxy naphthalene; bis-(4-hydroxyphenyl)-sulfone; 2,2'dihydroxydiphenyl sulfone;

4,4'dihydroxydiphenyl ether; and 4,4'dihydroxy-2,5-diethoxydiphenyl ether.

Two or more different dihydric phenols may be used if required. The preferred polycarbonate is based on 2,2-bis(4-hydroxyphenyl) propane.

Non-limiting examples of polycarbonate poly blends which may be used in the present invention are the blends with a polyester (e.g. 1,4-butylene terephthalate), polyethylene, polypropylene, polyisobutylene, co-polymers of ethylene and propylene, cellulose acetate, butyrate, or copolymers of ethylene and alkyl acrylate. The poly blends can contain 50% poly carbonate, but preferably contain at least 75% polycarbonate and most preferably at least 85% polycarbonate.

The linear polyesters of the invention can be represented by the residue resulting from (i) self-esterification of a hydroxy-acid —O—R—CO— or (ii) condensation of a dihydroxy alcohol and a dibasic acid —O—R—O—CO—R'—CO—.

Preferred polyesters are those based on phthalic acid or anhydride, terephthalic acid or isophthalic acid and a glycol. Non-limiting examples of polyesters are polyethylene terephthalate, poly (1,3-propylene) terephthalate and poly (1,4-butylene) terephthalate.

If required, co-polymerisation of dimethyl terephthalate and ethylene glycol with a third component can be carried out to increase dye affinity. Non-limiting examples of such substances are iso-phthalic acid, p-hydroxy-benzoic acid and polyethylene glycol. These polyesters can also be modified by replacing terephthalic acid with 1,2-diphenoxyethane-4,4'-dicarboxylic acid.

Non-limiting examples of other polyesters are those based on p-hydroxybenzoic acid and ethylene oxide, p-hydroxybenzoic acid, p(2-hydroxyethyl)benzoic acid and terephthalic acid and 1,4-bis-hydroxymethyl cyclohexane.

Non-limiting examples of the polyphenylene oxides which can be used in the present invention are those derived from repeated residues of the formula:

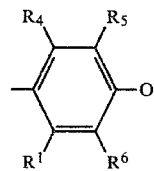

wherein $R^4$, $R^5$, $R^6$ and $R^7$ may be the same or different, and each is a hydrogen or halogen atom, or a hydrocarbon, substituted hydrocarbon, cyano, alkoxy, phenoxy, amino, sulpho or nitro group. For example, $R^4$, $R^5$, $R^6$ and $R^7$ may be hydrogen, chlorine, bromine or iodine atoms, or methyl, ethyl, propyl, allyl, phenyl, benzyl, methylbenzyl, chloromethyl, bromomethyl, cyanoethyl, cyano, methoxy, ethoxy, phenoxy or nitro groups. Specific examples of such polyphenylene oxides include poly-2,6-dimethyl-1,4-phenylene oxide, poly-2,6-diethyl-1,4-phenylene oxide, poly-2,6-dipropyl-1,4-phenylene oxide, poly-2,6-dimethoxy-1,4-phenylene oxide, poly-2,6-dichloro-methyl-1,4-phenylene oxide, poly-2,6-dibromomethyl-1,4-phenylene oxide, poly-2,6-diphenyl-1,4-phenylene oxide, poly-2,6-diphenyl-1,4-phenylene oxide, poly-2,6-ditolyl-1,4-phenylene oxide, poly-2,6-dichloro-1,4-phenylene oxide and poly-2,5-dimethyl-1,4-phenylene oxide.

The preferred polyphenylene oxide is poly-2,6-dimethyl 1,4-phenylene oxide. Poly blends of polyphenylene oxide with other polymers can also be used such as blends with polystyrene.

The preferred thermoplastic polyurethanes are those based on adipic acid, 1,4-butanediol and 4,4'-diphenyl methane di-isocyanate.

The polymer may be in sheet form, be moulded or be foamed.

The invention further relates to flame resistant cross-linked or cross-linkable polymers containing aromatic groups in the polymer chain. These comprises cross-linked polyester resins not containing vinylaromatic component. Non-limiting examples are copolymers of unsaturated polyesters containing aromatic components with tri allyl cyanurate, diallyl phthalate, triallyl phosphate, methyl methacrylate, ethylenglycol diacrylate or trimethylolpropane trisacrylate. Unsaturated polyesters containing aromatic components are polyesters or co-polyesters from aromatic decarboxylic acids, e.g. phthalic or isophthalic acid, or from aromatic diols, e.g. 2,2-bis(4-hydroxyphenyl)propane or 1,2-bis(2-hydroxy ethoxy)benzene. Another type of curable aromatic polyesters are the polyesters from phthalic acid and glycerol and possibly other diols and other polycarboxylic acids, which are known as alkyd resins.

Non-limiting examples of mixtures of compounds (a) and (b) which may be used with the polymers are listed below:

4,4'-bis hydroxymethyl biphenyl and tris(2,3-dichloropropyl) phosphate 4,4'-bis hydroxymethyl biphenyl and tris(2-bromoethyl) phosphate 4,4'-bis chloromethyl biphenyl and Reofos 95 *)

4,4'-bis hydroxymethyl biphenyl and Reofos 95 *)

*) Commercial mixture of isopropylated triphenyl phosphate 4,4'-bis hydroxymethyl biphenyl and tritolyl phosphate 4,4'-bis hydroxymethyl biphenyl and triphenyl phosphate 4,4'-bis hydroxymethyl biphenyl and tris(2,3-dibromopropyl) phosphate 4,4'-bis hydroxymethyl biphenyl and phenyl di-(2-bromoethyl) phosphate 4,4'-bis (hydroxymethyl) biphenyl and tris(2-chloroethyl) phosphate 4,4'-bis methoxymethyl biphenyl and Reofos 95

4,4'-bis methoxymethyl biphenyl and tri-tolyl phosphate 4,4'-bis methoxymethyl biphenyl and triphenyl phosphate 4,4'-bis methoxymethyl biphenyl and cresyl diphenyl phosphate
4,4'-bis(acetoxymethyl)biphenyl and Reofos 95
4,4'-bis(acetoxymethyl)biphenyl and cresyl diphenyl phosphate
4,4'-bis(acetoxymethyl)biphenyl and iso-decyl diphenyl phosphate
4,4'-bis(acetoxymethyl)biphenyl and tris[o-(bromo isopropyl) phenyl] phosphate
4,4'-bis(acetoxymethyl)biphenyl and tris(2,3-dibromopropyl) phosphate
4,4'-bis(acetoxymethyl)biphenyl and phenyl di(2-bromoethyl) phosphate
1,5-bis-hydroxymethyl naphthalene and tris (2,3-dichloropropyl) phosphate
1,5-bis-hydroxymethyl naphthalene and tris (2-bromo ethyl) phosphate
1,5-bis-hydroxymethyl naphthalene and Reofos 95
1,5-bis-hydroxymethyl naphthalene and tritolyl phosphate
1,5-bis-hydroxymethyl naphthalene and triphenyl phosphate
1,5-bis-hydroxymethyl naphthalene and tris (2,3-dibromopropyl) phosphate
1,4-bis-hydroxymethyl naphthalene and phenyl di(2-bromoethyl) phosphate
1,5-bis-hydroxymethyl naphthalene and tris (2-chloroethyl) phosphate
1,5-bis-hydroxymethyl naphthalene and cresyl diphenyl phosphate
1,4-bis-methoxymethyl naphthalene and tris (2,3-dichloropropyl) phosphate
1,5-bis-methoxymethyl naphthalene and tris (2-bromoethyl) phosphate
1,5-bis-methoxymethyl naphthalene and Reofos 95
1,5-bis-methoxymethyl naphthalene and tritolyl phosphate
1,5-bis-methoxymethyl naphthalene and triphenyl phosphate
1,4-bis-methoxymethyl naphthalene and tris (2,3-dibromopropyl) phosphate
1,5-bis-methoxymethyl naphthalene and phenyl di(2-bromoethyl) phosphate
1,5-bis-methoxymethyl naphthalene and tris (2-chloroethyl) phosphate
1,5-bis-methoxymethyl naphthalene and cresyl diphenyl phosphate
1,5-bis-hydroxymethyl naphthalene and triphenyl phosphine oxide
4,4'-bis-methoxymethyl biphenyl and tricresyl phosphine oxide
1,4-bis-hydroxy naphthalene and tris-(4-isopropyl-phenyl) phosphine oxide Mixtures of phosphorus compounds can be used, if desired, as can mixtures of compounds of formula I.

Compounds of type (b) which have been found to have a particularly marked fire retardant effect are those of the formula:

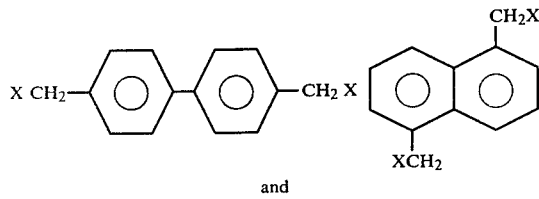

and

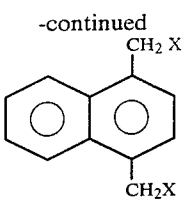

and oligomers thereof, where X represents Cl, OH, OR$^1$ or acyloxy, and R$^1$ is as defined before. These compounds are preferably used in admixture with aromatic phosphates or halo-alkyl phosphates or aryl halo-alkyl phosphates or mixtures thereof. Most preferred are mixtures of compounds of the above structure and aromatic phosphates.

Compounds of type (b) may optionally be mixed with other non-deactivated aromatic compounds containing vacant positions on an aromatic ring, such as compounds of the formula RCH$_2$X where R and X are as defined above. In some cases further enhancement of fire retardance may be obtained thereby. Non-limiting examples of such compounds are: 4-acetoxy diphenyl-methane, 4-methoxy diphenyl methane, 4-acetoxy (2,2-diphenyl propane), 4-methoxy (2,2-diphenyl propane), 1-acetoxy naphthalene, 1-methoxy naphthalene, 1-acetoxy-4-phenyl benzene, 1-acetoxy-2-phenyl benzene, 1-hydroxy methyl naphthalene, 1-hydroxymethyl-4-phenyl benzene, diphenyl ether, biphenyl, terphenyl, polybenzyl, Novolaks and Novolak ethers, e.g. glycidyl ethers, polyphenyl ethers, 4-hydroxy methyl biphenyl, 4-hydroxy methyl diphenyl ether, 4-methoxy methyl diphenyl ether, 4-acetoxy methyl diphenyl ether, 1-hydroxy methyl-2-phenyl benzene, mono-methyl monohydroxymethyl naphthalenes, mono-hydroxymethyl phenanthrene.

The compositions of the invention may also contain other additives usual in plastics technology. For example they may contain heat stabilisers, light stabilisers, UV absorbers, antioxidants, fillers, pigments, lubricants, additives to improve mold release, fungicides, blowing agents, optical brightening agents or other fire retardant additives. Suitable antioxidants include the sterically hindered phenol compounds for example: 2,2'-thio-bis-(4-methyl-6-tert.butylphenyl), 4,4'-thio-bis-(3-methyl-6-tert.butylphenol), 2,2'-methylene-bis-(4-methyl-6-tert.butylphenyl), 2,2'-bis(4,4'-phenylol) propane, 2,2'-methylene-bis-(4-ethyl-6-tert.butylphenyl), 4,4'-methylene-bis-(2-methyl-6-tert.butyl-phenol), 4,4'-butylidene-bis-(3-methyl-6-tert.butylphenol), 2,2'-methylene-bis[4-methyl-6-(α-methyl-cyclohexyl)-phenol], 2,6-di(2-hydroxy-3-tert.butyl-5-methylbenzyl) 4-methyl-phenol, 2,6-di-bert.butyl-4-methylphenol, 1,1,3-tris-(2-methyl-4-hydroxy-5-tert.butyl-phenyl)-butane, 1,3,5-trimethyl-2,4,6-tri(3,5-di-tert.butyl-4-hydroxy-benzyl)-benzene, esters of β-4-hydroxy-3,5-di-tert.butylphenyl-propionic acid with monohydric or polyhydric alcohols, such as methanol, ethanol, octadecanol, hexanediol, noneanediol, thiodiethylene glycol, trimethylolethane or pentaerythritol, 2,4-bis-octylmercapto-6-(4-hydroxy-3,5-di-tert.butylanilino)-s-triazine, 2,4-bis-(4-hydroxy-3,5-di-tert.butylphenoxy)6-octylmercapto-s-triazine, 1,1-bis(4-hydroxy-2-methyl-5-tert.butyl phenyl)-3-dodecyl-mercapto-butane, 2,6-di-t-butyl-p-cresol, 2,2-methylene-bis(4-methyl-6-t-butylphenol), 4-hydroxy-3,5-di-tert.butylbenzylphosphonic acid esters, such as the dimethyl, diethyl or dioctadecyl ester, (3-methyl-4-hydroxy-5-tert.butyl benzyl)-malonic acid dioctadecyl ester, s-(3,5-dimethyl-4-hydroxyphenyl)-thioglycollic acid octadecyl ester, and esters of bis-(3,5-di-tert.butyl-4-hydroxybenzyl)-malonic acid, such as the didodecyl ester, the dioctadecyl ester and 2-dodecylmercapto-ethyl ester.

Suitable light stabilisers and UV absorbers include: sterically hindered cyclic amines of the formula III

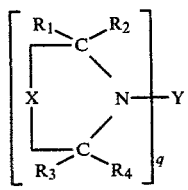

and salts thereof in which q is 1 or 2, X represents an organic grouping which complements the nitrogen-containing ring to give a 5-membered, 6-membered or 7-membered ring, $R_1$ and $R_2$ represent methyl or together represent —$(CH_2)_5$—, $R_3$ represents methyl, $R_4$ represents alkyl with 1-5 carbon atoms or together with $R_3$ represents the radicals —$(CH_2)_4$—, —$(CH_2)_5$—, —$CH_2$—$C(CH_3)_2$—$NH$—$C(CH_3)_2$—$CH_2$— or —$CH_2$—$C(CH_3)_2$—$N(O)$—$C(CH_3)_2$—$CH_2$— and, if q is 1, Y denotes hydrogen, —O; hydroxyl, alkyl, substituted alkyl, alkenyl, alkynyl, aralkyl, substituted aralkyl or acyl or, if q is 2, Y denotes alkylene, alkenylene, alkynylene, cycloalkylene or aralkylene.

Examples of sterically hindered cyclic amines of formula III are 4-benzoyloxy-, 2,2,6,6-tetramethylpiperidine; 4-capryloyloxy-2,2,6,6-tetramethylpiperidine; 4-stearoyloxy-2,2,6,6-tetramethylpiperidine; bis-(2,2,6,6-tetramethyl-4-piperidyl)-sebacate; bis-(2,2,6,6-tetramethyl-4-piperidyl)-dodecanedioate and bis-(1,2,2,6,6-pentamethyl-4-piperidyl)-sebacate.

2-(2'-Hydroxyphenyl)-benztriazoles, such as for example, the 5'-methyl-, 3',5'-di-tert.butyl-, 5'-tert.butyl-5'-(1,1,3,3-tetramethylbutyl)-, 5-chloro-3',5'-di-tert.butyl-, 5-chloro-3'-tert.butyl-5'-methyl-, 3'-sec.butyl-5'-tert.butyl-, 3'-α-methylbenzyl-5'-methyl-, 3'-α-methylbenzyl-5'-methyl-5-chloro-, 4'-hydroxy-, 4'-methoxy-, 4'-octoxy-, 3',5'-di-tert.amyl-, 3'-methyl-5'-carbomethoxyethyl- and 5-chloro-3',5'-di-tert.-amyl-derivative.

2,4-Bis-(2'-hydroxyphenyl)-6-alkyl-s-triazines, such as for example, the 6-ethyl-, 6-heptadecyl- or 6-undecyl-derivative.

2-Hydroxy-benzophenones, such as, for example, the 4-hydroxy-, 4-methoxy-, 4-octoxy-, 4-decyloxy-, 4-dodecyloxy-, 4-benzyloxy-, 4,2',4'-trihydroxy- or 2'-hydroxy-4,4'-dimethoxyderivative.

1,3-Bis-(2'-hydroxybenzoyl)-benzenes, such as, for example, 1,3-bis-(2'-hydroxy-4'-hexyloxy-benzoyl)-benzene, 1,3-bis(2'-hydroxy-4'-octyloxy-benzoyl)-benzene and 1,3-bis-(2'-hydroxy-4'-dodecyloxy-benzoyl)-benzene.

Esters of optionally substituted benzoic acids, such as, for example, phenyl salicylate, octylphenyl salicylate, dibenzoylresorcinol, bis-(4-tert.-butylbenzoyl)-resorcinol, benzoylresorcinol and 3,5-di-tert.-butyl-4-hydroxybenzoic acid 2,4-di-tert.butyl-phenyl ester or octadecyl ester or 2-methyl-4,6-di-tert.butyl-phenyl ester.

Acrylates, such as, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester and N-(β-carbomethoxy-vinyl)-2-methyl-indoline.

Oxalic acid diamides, such as, for example, 4,4'-dioctyloxy-oxanilide, 2,2'-di-octyloxy-5,5'-di-tert.butyloxanilide, 2,2'-di-dodecyloxy-5,5'-di-tert.butyl-oxanilide, 2-ethoxy-2'-ethyl-oxanilide, N,N'-bis-(3-dimethylaminopropyl)oxalamide, 2-ethoxy-5-tert.butyl-2'-ethyl-oxanilide and its mixture with 2-ethoxy-2'-ethyl-5,4'-di-tert.butyl-oxanilide and mixtures of ortho- and para-methoxy- as well as of o- and p-ethoxy-disubstituted oxanilides.

Nickel compounds, such as, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel complexes of bis-[2-hydroxy-4-(1,1,3,3-tetramethylbutyl)-phenyl]-sulphone, such as the 2:1 complex, optionally with additional ligands and as 2-ethyl-caproic acid, nickel dibutyldithiocarbamate, nickel salts of 4-hydroxy-3,5-di-tert.butylbenzyl-phosphonic acid monoalkyl esters, such as the methyl, ethyl or butyl ester, nickel complexes of ketoximes such as of 2-hydroxy-4-methyl-phenyl-undecylketonoxime and nickel 3,5-di-tert.butyl-4-hydroxy-benzoate.

When compositions contain a halogenated compound such as PVC they may contain conventional PVC stabilisers.

These additives may be used alone or in any combination.

The compositions may also contain other stabilising and lubricating components such as: pentacrythritol, triphenyl phosphite, decyl diphenyl phosphite, didecyl phenyl phosphite, trinonyl phenyl phosphite, stearic acid, hydroxy stearic acid, low molecular weight polyethylene wax, mineral oil, butyl stearate, paraffin wax, oxidised paraffin wax, fatty alcohols, esters of straight chain fatty alcohols and straight chain fatty acids (in which the acids or alcohols are natural or synthetic), monoesters of glycols and straight chain fatty acids, methylene bis stearamide. Suitable pigments include organic and inorganic pigments or mixtures thereof. If an organic pigment is used it may be, for example, a phthalocyanine which may be a metal phthalocyanine such as copper phthalocyanine, a metal free phthalocyanine or a chlorinated metal or metal free phthalocyanine, for example a chloromethylated phthalocyanine. Other organic pigments include azo pigments (monoazo or diazo), anthraquinone and metal complexes. If an inorganic pigment is used, it may be for example, titanium dioxide, carbon black or iron oxide. Additives to improve mould release for use with moulded compositions include long chain acids and amides. Suitable fillers include asbestos, glass fibres, kaolin and talc.

The composition may also contain blowing agents when a foamed composition is desired, non-limiting examples being aliphatic hydrocarbons of chain length up to $C_7$, mixtures of sodium bicarbonate or carbonate with acetic, fumaric, malonic, citric or tartaric acids which produce carbon dioxide, and N-containing blowing agents, and halogenated hydrocarbons.

Other conventional fire retardant additives may be present, such as antimony oxide, chlorinated paraffins, or brominated alkyl or brominated aryl derivatives.

Compounds (a) and (b) may be incorporated into the polymer in a number of ways. For example, in the case of polystyrene, they may be added to styrene which is then polymerised in the presence of compounds (a) and (b) or the polystyrene may be dissolved in a solvent and compounds (a) and (b) added to the solution. The polymer granules may be dry-blended with compounds (a) and (b) in a high speed mixer, and the dispersion fed to a compounder-extruder for melt-blending, and finally granulating. In the case of cross-linkable polymers (a) and (b) are added before the curing operation.

The aromatic compounds of formula I used in the present invention are either known or can be readily prepared by well established methods. For example the parent aromatic compound may be chloromethylated by reaction with formaldehyde and hydrogen chloride gas. This reaction is described in "Organic Reactions", Vol. I, 63 (1942). Displacement of the chlorine atom by other nucleophiles can give other compounds of the present invention.

Examples of these reactions are:

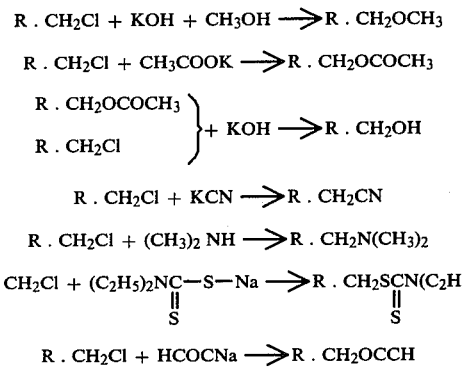

R.CH$_2$Cl compounds may also be prepared by side-chain chlorination of methyl groups, i.e. by reaction of R.CH$_3$ compounds with chlorine gas.

Groups other than —CH$_2$Cl may be introduced directly into an aromatic nucleus by one stage reactions. Reactions of this type are reviewed in "Formation of C-C Bonds", Vol I by Jean Mathieu and Jean Weill-Raynal. Examples of CH$_2$X groups which may be directly introduced into an aromatic nucleus are:

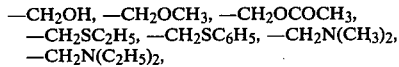

Other, less direct, routes to R(CH$_2$X)$_n$ type compounds may be employed. For example an aldehyde group can be introduced into an aromatic compound either directly by reaction with carbon monoxide or by hydrolysis of a di-alkoxymethylated or di-halomethylated aromatic. The aldehyde group may then be reduced to a hydroxymethyl group.

The hydroxymethylated aromatic may also be used as an intermediate in the preparation of other R(CH$_2$X)$_n$ compounds, for example

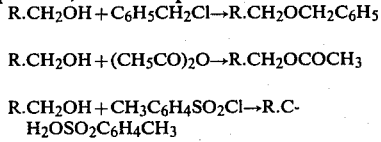

More detailed methods of preparation of compounds of the present invention are given below. These methods are exemplified here by preparation of biphenyl derivatives but may be employed to produce derivative of other aromatic R groups.

METHOD A.
4,4'-BIS(CHLOROMETHYL)BIPHENYL 0.1 mole diphenyl, 0.075 mole paraformaldehyde, 0.07 mole zinc chloride and 50 mls cyclohexane were treated with dry hydrochloric acid gas with stirring at 55°-60° C. for 20 hours. The reaction mixture was poured into water and the organic material extracted with cyclohexane which was evaporated to dryness to give 0.06 moles product=60 percent of theory.

mp=137°-8° C.

METHOD B.
4,4'-BIS(METHOXYMETHYL)BIPHENYL 0.1 moles 4,4'bis(chloromethyl)biphenyl (prepared by method A above), 0.4 moles potassium hydroxide and 150 mls of methanol were refluxed for 4 hours with stirring. The reaction mixture was neutralised with concentrated hydrochloric acid and filtered. The filtrate was evaporated to dryness at 80° C. under water pump vacuum and the residue fractionally distilled. The fraction boiling between 154° C. and 156° C. at 0.2 mm. Hg pressure was collected. Yield of product=0.075 moles=75 percent of theory.

mp=47°-49° C.

METHOD C.
4,4'-BIS(ACETOXYMETHYL)BIPHENYL 0.1 moles 4,4'bis(chloromethyl)biphenyl (prepared by method A above), 0.25 moles potassium acetate and 100 mls glacial acetic acid were reflux for 17 hours with stirring. The reaction mixture was filtered and the filtrate evaporated to dryness at 80° C. under water pump vacuum. The residue was recrystallised from methanol to yield 0.068 moles product=68 percent of theory.

mp=86°-87° C.

METHOD D.
4,4'-BIS(HYDROXYMETHYL)BIPHENYL 0.1 moles 4,4'bis(acetoxymethyl)biphenyl (prepared by method C above), 0.4 mole sodium hydroxide as 23 percent aqueous solution and 50 mls ethanol were refluxed for 3 hours with stirring. The reaction mixture was filtered and the precipitate washed with water and dried to yield 0.08 moles product=80 percent of theory. m.p. 195°97° C.

The oligomers described above can be prepared by conventional methods; examples of which are:

(a) the reaction of naphthalene with formaldehyde in the presence of an acid catalyst to produce oligomers with structures having predominently methylene (—CH$_2$—) and acetal (—(CH$_2$O)$_n$—CH$_2$—) links with some di-methylene ether links (—CH$_2$—O—CH$_2$—) or (b) by the chloromethylation of naphthalene to produce mixtures of mono, di and higher chloromethyl naphthalenes which are then hydrolysed and oligomerised to produce oligomers having predominently di-methylene ether (—CH$_2$—O—CH$_2$—) and methylene (—CH$_2$—) links, or (c) by reacting a chloromethylated aromatic compounds, e.g. benzylchloride, with formaldehyde or a precursor thereof, such as tri-oxymethylene, and an acid catalyst to give a chloromethylated di-aryl methane, e.g. bis-chloromethyl diphenylmethane. The latter are hyrolysed and oligomerised with aqueous sodium carbonate or are converted via the acetoxymethyl compounds into the hydroxymethyl derivatives and then oligomerised with an acid catalyst.

Methods of preparation of the oligomers are illustrated by the following examples.

METHOD E. PREPARATION OF NAPHTHALENE OLIGOMERS (TABLE 8, EXAMPLES 45–48) CHLOROMETHYLATION

This reaction is carried out in a fume cupboard because of the possible formation of bis-chloromethyl ether in the vapour phase.

A 5 liter 4-neck round bottom flask is fitted with a stirrer, thermometer, gas inlet tube and a reflux condenser. The off-gas from the reaction is conveyed to a scrubber in which 2 liters of water is continuously circulated and maintained alkaline to phenolphthalein by addition of 46% w/w aqueous sodium hydroxide as required.

Naphthalene (4 moles) concentrated hydrochloric acid (13.8 moles), paraformaldehyde (23.2 moles) and zinc chloride catalyst (0.19 moles) are charged to the flask and heated and stirred at 90° C. for 12 hours. During this period, hydrogen chloride gas is passed into the reaction mixture and analysis showed the degree of chloromethylation to be 1.47 moles-$CH_2Cl$/mole naphthalene.

HYDROLYSIS OF CHLOROMETHYLATED NAPHTHALENE USING AQUEOUS SODIUM CARBONATE

To the crude chloromethylated naphthalene from above is added sodium carbonate (3.09 moles) and 2429 gms. water. The reaction mixture is stirred and heated at 100° C. for eight hours. Sodium hydroxide (1.62 moles) is then added as a 46% w/w solution and heating and stirring at 100° C. Continued for a further six hours. The mixture is allowed to cool and the aqueous phase removed by decantation. The organic phase is washed twice with water at 60° C. and finally dried by heating and stirring for three hours at 110° C. and 20 mm. mercury pressure to give a viscous oil (Yield=81% of theory).

OLIGOMERISATION

The hydroxymethyl naphthalene oligomer from above is heated in toluene (about 13% w/w) with 88% phosphoric acid (1% w/w) as catalyst. The reaction is carried out in a flask fitted with a stirrer, thermometer and a water separator surmounted by a reflux condensed. The mixture is heated for 4.5 hours at 150° C. and 0.47 moles water/mole starting material are removed.

The reaction mixture is allowed to cool, diluted with chloroform, washed twice with water and the solvent removed by heating in a distillation apparatus under reduced pressure. The product is finally stripped at 110° C. for three hours at 20 mm. mercury pressure to yield 84% of a brittle solid. Average molecular weight=550.

METHOD F. PREPARATION OF NAPHTHALENE OLIGOMERS (TABLE 8, EXAMPLES 51–57)

Chloromethylation

Using the method previously described, naphthalene (4 moles), concentrated hydrochloric acid (13.8 moles) formaldehyde, as 37% aqueous solution (18.9 moles) and zinc chloride (0.19 moles) are reacted at 90° C. for 22 hours with hydrogen chloride gas passed into the reaction mixture at 230 mls./minute. NMR analysis of the reaction mixture showed the degree of chloromethylation to be 1.88 moles —$CH_2Cl$/mole naphthalene.

HYDROLYSIS OF CHLOROMETHYLATED NAPHTHALENE USING AQUEOUS SODIUM CARBONATE

To the crude chloromethylated naphthalene from above is added sodium carbonate (3.57 moles) and 2806 gm. water. The reaction mixture is hydrolysed as previously described with subsequent addition of sodium hydroxide (1.35 moles) to yield 73% of a viscous liquid. Average molecular weight=380.

METHOD G. PREPARATION OF NAPHTHALENE OLIGOMERS (TABLE 8, EXAMPLE 49)

Chloromethylation

Using the method previously described naphthalene (4 moles) concentrated hydrochloric acid (13.8 moles) formaldehyde as 37% aqueous solution (18.9 moles) are reacted at 90° C. for 12 hours with hydrogen chloride gas passed into the reaction mixture at 450 ml/minute. NMR analysis of the reaction mixture showed the degree of chloromethylation to be 1.5 moles —$CH_2Cl$/mole naphthalene.

CONVERSION OF CHLOROMETHYL NAPHTHALENES INTO THE CORRESPONDING ACETOXYMETHYL DERIVATIVES

To the chloromethylated naphthalene mixture from above (3.64 moles) is added potassium acetate (9.14 moles) and glacial acetic acid (55.3 moles). The reactants are stirred under reflux at 122° C. for nine hours. After cooling to room temperature the reaction mixture is filtered and the white precipitate washed with hot acetic acid. The filtrate and washings are then stripped under 20 mm. mercury pressure up to a maximum internal temperature of 100° C. The residual crude product is then stirred with dichloromethane at room temperature, filtered, the precipitate washed with dichloromethane and the combined filtrate and washings stripped under a pressure of 20 mm. mercury up to an internal temperature of 100° C. to leave the product an equimolar mixture of 1 mono and 1,5 bis acetoxymethyl naphthalenes as the distillation residue.

HYDROLYSIS OF ACETOXYMETHYL NAPHTHALENES TO THE CORRESPONDING HYDROXYMETHYL NAPHTHALENES

The acetoxymethyl naphthalene mixture from above (1.53 moles) is hydrolysed by refluxing in its own weight of ethanol with sodium hydroxide (5.45 moles) as 20% aqueous solution for approximately 7 hours. The reaction mixture is then diluted with water and cooled to room temperature. The mixture is extracted with ether, the latter washed several times with water and then dried over sodium sulphate. The ether is removed by distillation and the residual product finally stripped for 1 hour at 100° C. and 20 mm. mercury pressure to yield 86% of a waxy solid equimolar mixture of mono- and bis-(hydroxymethyl) naphthalenes.

OLIGOMERS DERIVED FROM HYDROXYMETHYL NAPHTHALENES

The mixture of hydroxymethyl naphthalenes from above is oligomerised as previously described by heating in toluene (about 13% w/w) with 88% phosphoric acid (1% w/w) as catalyst. The mixture is heated for 4 hours at 150° C. and 0.53 moles water/mole starting material are removed. The product is obtained in 94% yield and is a very viscous liquid, average molecular weight 530.

The following Examples further illustrate the invention:

EXAMPLES 1-23

Crystal polystyrene compositions were made up using several different flame retardant compositions as set out in Table 1 and in the amounts shown (parts being by weight).

The compositions, containing 100 pts polymer, were compounded on a two roll mill for 20–30 minutes at 120° C. The polymer was placed on the mill and the flame retardant composition added portion wise over 10–20 minutes. The polymer composition was then milled for a further 10–20 minutes. On completion of milling the polymer was pressed into sheets 6 inches by 6 inches by 0.10 inch (152×152×2,5 mm) in a press heated to 120° C.

The (Limiting) Oxygen Index (OI), as described in ASTM method 2863, of the sheets was then measured.

In Table 1, compositions of the invention, examples 1–23 are compared with polystyrene formulations containing no flame retardant and prior art flame retardants.

Table 1

Flame Retardant Tests in Crystal Polystyrene

| Example No. | R | X | n | Method of Prepn. | M.pt. or B.pt. | Parts of Cmpd. (I) | Phosphorus Ester (parts) | Other Additive (parts) | Oxygen Index % |
|---|---|---|---|---|---|---|---|---|---|
| Comparative Example A | — | — | — | — | — | — | — | — | 17.7 |
| B | — | — | — | — | — | — | Triphenyl Phosphate (20) | — | 22.9 |
| C | — | — | — | — | — | — | Tris (2-chloroethyl) phosphate (25) | — | 24.9 |
| D | — | — | — | — | — | — | Tris(2,3-dibromo-phate (25) | — | 28.7 |
| 1 | —⌬⌬— | OH | 2 | D | m.p. 195°–197° C. | 20 | Triphenyl Phosphate (20) | — | 30.0 |
| 2 | " | " | " | " | m.p. 195°–197° C. | 10 | Triphenyl Phosphate (25) | — | 37.1 |
| 3 | " | " | " | " | m.p. 195°–197° C. | 7.5 | Triphenyl Phosphate (18.5) | — | 31.6 |
| 4 | " | " | " | " | m.p. 195°–197° C. | 5 | Triphenyl Phosphate (20) | — | 26.5 |
| 5 | " | " | " | " | m.p. 195°–197° C. | 10 | Triphenyl Phosphate (15) | — | 26.2 |
| 6 | " | " | " | " | m.p. 195°–197° C. | 15 | Triphenyl Phosphate (10) | — | 26.1 |
| 7 | " | " | " | " | m.p. 195°–197° C. | 14 | Triphenyl Phosphate (35) | — | 33.7 |
| 8 | " | " | " | " | m.p. 195°–197° C. | 7.5 | Triphenyl Phosphate (18.75) | PVC (10) | 31.5 |
| 9 | " | " | " | " | m.p. 195°–197° C. | 7.5 | Triphenyl Phosphate (18.75) | PVC (30) | 39.4 |
| 10 | " | " | " | " | m.p. 195°–197° C. | 10 | Tris(2,3-dibromopropylphosphate) (25) | — | 34.8 |
| 11 | " | " | " | " | m.p. 195°–197° C. | 5 | Tris(2,3-dibromopropylphosphate) (25) | — | 33.6 |
| 12 | " | " | " | " | m.p. 195°–197° C. | 7.5 | Triphenyl Phosphate (18.75) | PVC (30) DBTM (1) | 42.3 |
| 13 | ⌬(Me,Me) | " | " | " | | 10 | Tris(2,3-dibromopropyl)phosphate (25) | — | 31.2 |
| 14 | —⌬⌬— | OCH$_3$ | " | B | m.p. 50°–52° C. | " | Tris(2,3-dibromopropyl)phosphate (25) | — | 35.8 |
| 15 | " | " | " | " | m.p. 50°– | " | Tris(2-chloroethyl)phosphate | — | 25.8 |

Table 1-continued

Flame Retardant Tests in Crystal Polystyrene

| Example No. | R | X | n | Method of Prepn. | M.pt. or B.pt. | Parts of Cmpd. (I) | Phosphorus Ester (parts) | Other Additive (parts) | Oxygen Index % |
|---|---|---|---|---|---|---|---|---|---|
| 16 | (methylnaphthyl) | OH | " | D | 52° C. | " | Triphenyl phosphate (25) | — | 34.7 |
| 17 | (biphenyl) | Cl | " | A | m.p. 136–37° C. | " | Tris(2-chloroethyl)phosphate (25) | — | 28.5 |
| 18 | " | OH | " | D | m.p. 195–97° C. | " | tris(tirchloroethyl)phosphate | — | 26.8 |
| 19 | " | " | " | " | m.p. 195–97° C. | " | diphenyl trichloroethyl phosphate (25) | — | 33.8 |
| 20 | " | " | " | " | m.p. 195–97° C. | 5 | Triphenyl phosphate (25) | — | 31.7 |
| 21 | " | " | " | " | m.p. 195–97° C. | 15 | Triphenyl phosphate (25) | — | 40.2 |
| 22 | " | (tribromophenoxy) Br | " | B | m.p. 238°–241° C. | 4 | Tris(2-chloroethyl phosphate (10) | — | 26.1 |
| 23 | " | OH | " | D | m.p. 195–97° C. | 10 | Tris(2-naphthyl) phosphate (25) | — | 28.8 |

PVC = polyvinyl chloride
DBTM = dibutyl tin maleate

The results shown in Table 1 illustrate the great improvement in flame resistance, as measured by Oxygen Index, that is obtained by the combined use of compounds of types a and b over polystyrene containing no FR additive and over polystyrene when it contains only a compound of type (a).

EXAMPLES 24–27

The compositions shown in Table 2 were prepared from high impact polystyrene according to the procedure used for Examples 1–23.

The results in Table 2 clearly illustrate the marked effect of using high impact polystyrene compositions containing compounds a and b over a composition, Example F not containing compounds a and b, and our composition G containing only compound (a).

EXAMPLES 28 AND 29

The compositions shown in Table 3 were prepared, according to the procedure used for Examples 1–23, but from a copolymer of acrylonitrile, butadiene and styrene (known as ABS), and at the higher processing temperature of 120°–140° C.

Table 2

Flame Retardant Tests in High Impact Polystyrene

| Example No. | R | X | n | Method of Prepn. | M.pt. or B.pt. | Parts of Cmpd. (I) | Phosphorus Ester (parts) | Other Additive (parts) | Oxygen Index % |
|---|---|---|---|---|---|---|---|---|---|
| Comparative Example F | — | — | — | — | — | — | — | — | 18.3 |
| G | — | — | — | — | — | — | Reofos 95 (25) | — | 20.3 |
| 24 | (biphenyl) | OH | 2 | D | M.pt. 195–197° C. | 7.5 | Triphenyl Phosphate (18.75) | — | 31.3 |
| 25 | " | " | " | " | " | 10 | Reofos 95 (25) | — | 35.8 |
| 26 | " | Cl | 2 | A | M.pt. 137–138° C. | 10 | Reofos 95 (25) | — | 26.5 |
| 27 | " | OCH₃ | 2 | B | M.pt. 47°–49° C. | 10 | Reofos 95 (25) | — | 25.4 |

PVC = polyvinyl chloride
DBTM = dibutyl tin maleate

Table 3

Flame Retardant Tests in Acrylonitrile/Butadiene/Styrene-Copolymer

| Example No. | R | X | n | Method of Prepn. | M.pt. or B.pt. | Parts of Cmpd. (I) | Phosphorus Ester (parts) | Other Additive (parts) | Oxygen Index % |
|---|---|---|---|---|---|---|---|---|---|
| Comparative Example H | — | — | — | — | — | — | — | — | 18.2 |
| I | — | — | — | — | — | — | Triphenyl Phosphate (25) | — | 21.0 |
| 28 | –⟨○⟩–⟨○⟩– | OH | 2 | D | M.pt. 195–197° C. | 10 | Triphenyl Phosphate (25) | — | 27.5 |
| 29 | " | OCH₃ | 2 | B | M.pt. 47°–49° C | 11.3 | Triphenyl Phosphate (25) | — | 25.7 |

PVC = polyvinyl chloride
DBTM = dibutyl tin maleate

The results in Table 3 show the marked improvement in flame retardancy by using compounds of types a and b together in a co-polymer of polystyrene compared with Examples H and I not containing compounds a and b.

EXAMPLES 30 AND 31

The compositions shown in Table 4 were prepared, according to the procedure used for Examples 1-23, but with processing at 120°-130° C. from a co-polymer of styrene and acrylonitrile.

The results in Table 4 show the marked improvement in flame retardancy by using compounds of types a) and b) together in a co-polymer of polystyrene compared with Examples J, K and L not containing compounds a) and b).

EXAMPLES 32 TO 44

The compositions shown in Tables 5, 6 and 7 were prepared by mixing the components for 10-15 minutes at 240° C. followed by pressing for 10 minutes at 240° C. to give a sheet of polystyrene/polyphenylene ether blend.

Table 4.

Flame Retardant Tests in styrene/acrylonitrile-copolymer

| Example No. | R | X | n | Method of Prepn. | M. pt. or B. pt. | Parts of Cmpd. (I) | Phosphorus Ester (parts) | Other Additive (parts) | Oxygen Index % |
|---|---|---|---|---|---|---|---|---|---|
| Comparative Example J | — | — | — | — | — | — | — | — | 19.2 |
| K | — | — | — | — | — | — | Triphenyl Phosphate (25) | — | 23.6 |
| L | — | — | — | — | — | — | Tris(2-chloroethyl) phosphate (25) | — | 24.1 |
| 30 | –⟨○⟩–⟨○⟩– | OH | 2 | D | m.pt. 195°–197° C. | 10 | Triphenyl-phosphate (25) | — | |
| 31 | –⟨○⟩–⟨○⟩– | OH | 2 | D | m.pt. 195°–197° C. | 10 | Tris(2-chloroethyl) phosphate (25) | — | 31.7 |

Table 5.

Flame Retardant Tests in polystyrene/polyphenylene ether blend (Noryl 731-604)

| Example No. | R | X | n | Method of Preparation | Parts of compound I | Phosphorus ester | Other Additive (Parts) | Oxygen Index % |
|---|---|---|---|---|---|---|---|---|
| Comparative Example M | | | | | | — | — | 22.3 |
| N | — | — | — | — | — | TPP | — | 28.1 |
| 32 | –⟨○⟩–⟨○⟩– | OH | 2 | D | 10 | TPP | — | 39.2 |

Table 5.-continued

Flame Retardant Tests in polystyrene/polyphenylene ether blend (Noryl 731-604)

| Example No. | R | X | n | Method of Preparation | Parts of compound I | Phosphorus ester | Other Additive (Parts) | Oxygen Index % |
|---|---|---|---|---|---|---|---|---|
| 33 | -⬡-⬡- | OH | 2 | D | 7.5 | TPP | — | 40.1 |

Table 6.

Flame Retardant Tests in polystyrene/polyphenylene ether blend (Noryl 110-780)

| Example No. | R | n | X | Method of Preparation | Parts of compound I | Phosphorus ester | Oxygen Index % |
|---|---|---|---|---|---|---|---|
| Comparative Example O | — | — | — | — | — | — | 20.3 |
| P | — | — | — | — | — | TPP | 27.1 |
| 34 | -⬡-⬡- | 2 | OCH$_3$ | B | 11.3 | TPP | 37.9 |
| 35 | -⬡-⬡- | 2 | OCOCH$_3$ | C | 14 | TPP | 39.7 |
| 36 | -⬡-⬡- | 2 | OH | D | 10 | TPP | 38.8 |
| 37 | -⬡-⬡- | 2 | OH | D | 7.5 | TPP | 42.3 |
| 38 | -⬡-⬡- | 2 | OH | D | 4 | TPP | 36.3 |
| 39 | -⬡-⬡- | 2 | OH | D | 2 | TPP | 35.9 |
| 40 | -⬡-⬡- | 2 | OH | D | 8 | TPP | 39.1 |
| Comparative Example Q | — | — | — | — | — | TDBP | 26.7 |
| 41 | -⬡-⬡- | 2 | OH | D | 5 | TDBP | 28.1 |

TPP = Triphenyl phosphate
TDBP = Tris(2,3-dibromopropyl)phosphate

Table 7.

Flame Retardant Tests in Polystyrene/Polyphenylene Ester Blend (Noryl SE1 211)

| Example No. | R | n | X | Method of Preparation | Parts of compound I | Phosphorus ester | Oxygen Index % |
|---|---|---|---|---|---|---|---|
| Comparative Example R | — | — | — | — | — | — | 29.3 |
| Comparative Example S | — | — | — | — | — | TPP | 36.3 |
| 42 | biphenyl | OH | 2 | D | 4 | TPP | 39.4 |
| 43 | " | OH | 2 | D | 4 | TPP | 41.5 |
| 44 | " | OH | 2 | D | 2 | TPP | 37.3 |

TPP = Triphenyl phosphate

The results in Tables 5, 6 and 7 show the effect in polystyrene/polyphenylene ether of using combinations of a) and b). Marked improvement in flame retardancy is observed over comparative examples M, N, O, P, Q, R and S which contain no additive or only compound a).

EXAMPLES 45 TO 67

Tables 8 and 9 show the flame retardant effect achieved when naphthalene oligomers are used in conjunction with a phosphorus compound to flame retard polystyrene/polyphenylene ether and polystyrene respectively. The results show the marked improvement in using (a) and (b) compared with the Examples T to W.

Table 8.

Flame Retardant Tests in Polystyrene/Polyphenylene Ether Blend using Oligomers

| Example No. | Compound I | M. Wt. | Parts Cpd. I | Method of preparation | Phosphorus ester (parts) | Polymer | Oxygen Index % |
|---|---|---|---|---|---|---|---|
| 45 | Naphthalene Oligomer | 550 | 4 | E | TPP(10) | Noryl 110-780 | 36.0 |
| 46 | " | 550 | 8 | E | TPP(10) | " | 39.4 |
| 47 | " | 550 | 2 | E | TPP(5) | " | 32.0 |
| 48 | " | 550 | 4 | E | TPP(5) | " | 33.4 |
| 49 | Oligomer prepared from mono and bis-hydroxy methyl naphthalene | 530 | 10 | G | TPP(25) | " | 43.7 |
| 50 | Oligomer prepared from 4,4'-bis-hydroxy methyl biphenyl | 530 | 10 | | TPP(25) | " | 50.1 |
| 51 | Naphthalene oligomer | 380 | 4 | F | TPP(10) | " | 36.0 |
| 52 | " | 380 | 8 | F | TPP(10) | " | 39.4 |
| 53 | " | 380 | 2 | F | TPP(5) | " | 32.0 |
| 54 | " | 380 | 4 | F | TPP(5) | " | 33.4 |
| 55 | " | 380 | 8 | F | TPP(5) | " | 35.2 |
| 56 | " | 380 | 4 | F | TPP(10) | Noryl SE1-211 | 39.6 |
| 57 | " | 380 | 2 | F | TPP(5) | " | 36.5 |
| Comparative Examples T | — | — | — | | TPP (5) | " | 25.0 |
| U | — | — | — | | TPP(10) | " | 28.0 |
| V | — | — | — | | TPP(25) | " | 28.1 |

TPP-Triphenyl phosphate

Table 9.

Flame Retardant Tests in Polystyrene using Oligomers

| Example No. | Compound I | M. Wt. | Parts Cpd. I | Method of preparation | Phosphorus Ester (parts) | Oxygen Index % |
|---|---|---|---|---|---|---|
| 58 | Naphthalene Oligomer | 550 | 5 | E | TPP (12.5) TCEP (12.5) | 24.0 |
| 59 | " | 550 | 10 | E | " | 35.2 |
| 60 | " | 550 | 15 | E | " | 41.9 |
| 61 | " | 550 | 20 | E | " | 57.0 |
| 62 | " | 550 | 23 | E | " | 58.5 |
| 63 | " | 550 | 10 | E | TPP (20) | 41.5 |

Table 9.-continued

Flame Retardant Tests in Polystyrene using Oligomers

| Example No. | Compound I | M. Wt. | Parts Cpd. I | Method of preparation | Phosphorus Ester (parts) | Oxygen Index % |
|---|---|---|---|---|---|---|
| 64 | " | 550 | 10 | E | TCEP (5) TPP (25) | 33.3 |
| 65 | " | 550 | 10 | E | TPP (12.5) + bis (chloroethyl)phenyl phosphate (12.5) | 33.1 |
| 66 | " | 380 | 10 | F | isopropylphenyl-phenyl phosphate (Reofos 95) (25) | 39.7 |
| 67 | " | 380 | 10 | F | diphenyl decyl phosphate (25) | 37.8 |
| Comparative Example W | — | — | — | — | TPP (20) + TCEP (5) | 23.0 |

TPP = Triphenyl phosphate
TCEP = Tris(chloroethyl)phosphate

EXAMPLES 68 TO 70

The composition shown in Table 10 were prepared by mixing the components for 10–15 minutes at 250° C. followed by pressing for 10 minutes at 240° C. to give a sheet of polycarbonate.

The results in Table 10 show the marked improvement in flame retardancy by using compounds of type (a) and (b) together in polycarbonate compared with the comparative Examples A$^1$, B$^1$, C$^1$ and D$^1$ not containing compounds (a) plus (b).

EXAMPLES 71 AND 72

The compositions shown in Table 11 were prepared by mixing the components at 270°–280° C. for 10–15 minutes followed by pressing for 10 minutes at 250° C. to give a sheet of polyphenylene oxide.

The results in Table 11 show the marked improvement in flame retardancy by using compounds of type (a) and (b) together in polyphenylene oxide compared with the Examples E$^1$, F$^1$ and G$^1$ not containing compounds (a) plus (b).

EXAMPLES 73–79

The compositions shown in Table 12 were prepared by the same procedure as Examples 68 and 69.

The results in Table 12 show the marked improvement in flame retardancy by using compounds of type (a) and (b) together in polycarbonate compared with the Examples H$^1$, I$^1$, J$^1$, K$^1$, L$^1$ and M$^1$ not containing compounds (a) plus (b).

Table 10.

Flame Retardant Tests in Polycarbonate (Lexan 141)

| Example No. | R | n | X | Method of Preparation | Parts of compound I | Phosphorus ester | Oxygen Index % |
|---|---|---|---|---|---|---|---|
| Comparative Example A$^1$ | — | — | — | — | — | — | 26.3 |
| B$^1$ | — | — | — | — | — | TPP | 32.5 |
| 68 | biphenyl | 2 | OH | D | 4 | TPP | 49.5 |
| 69 | biphenyl | 2 | OCH$_3$ | B | 4 | TPP | 37.5 |
| C$^1$ | — | — | — | — | — | — | 26.8 |
| D$^1$ | — | — | — | — | — | TPP | 28.3 |
| 70 | biphenyl | 2 | OH | D | 4 | " | 34.0 |

TPP = Triphenyl phosphate

Table 11.

| Example No. | R | Polyphenylene Oxide n | X | Method of Preparation | Parts of compound I | Phosphorus ester | Oxygen Index % |
|---|---|---|---|---|---|---|---|
| Comparative Example E[1] | — | — | — | — | — | — | 29.4 |
| F[1] | — | — | — | — | — | TDBP | 31.8 |
| G[1] | — | — | — | — | — | TDBP | 37.5 |
| 71 | ⟨biphenyl structure⟩ | 2 | OH | D | 4 | TDBP | 33.5 |
| 72 | " | 2 | OH | D | 10 | TDBP | 45.0 |

TDBP = Tris(2,3-Dibromopropyl)phosphate

Table 12.

Flame Retardant Test in Polycarbonate (Lexan 141) using Naphthalene Oligomers.

| Example No. | Compound I | M. Wt. | Parts Cpd. I | Method of preparation | Phosphorus ester (parts) | Oxygen Index % |
|---|---|---|---|---|---|---|
| 73 | Naphthalene Oligomer | 540 | 4 | E | TPP(5) | 30.4 |
| 74 | " | 540 | 5 | E | TCEP(5) TPP(20) | 50.5 |
| 75 | " | 440 | 10 | E | TPP(25) | 51.5 |
| 76 | " | 440 | 4 | E | TPP(10) | 39.4 |
| Comparative Example H[1] | — | — | — | | TPP(25) | 36.0 |
| I[1] | — | — | — | | TPP(10) | 32.5 |
| J[1] | — | — | — | | TPP(5) | 28.3 |
| K[1] | — | — | — | | TCEP(5) TPP(20) | 37.5 |
| L[1] | — | — | — | — | — | 26.3 |
| M[1] | — | — | — | — | Triphenyl phosphate (5) | 28.3 |
| 77 | Naphthalene Oligomer | 380 | 4 | F | Triphenyl phosphate (5) | 30.4 |
| 78 | " | 380 | 6 | F | Triphenyl phosphate (5) | 38.4 |
| 79 | " | 380 | 8 | F | Triphenyl phosphate (5) | 38.3 |

TCEP = Tris(2-chloroethyl)Phosphate
TPP = Tris-phenyl Phosphate

EXAMPLES 80 TO 107

The used polyester A is a 70% solution in styrene of a polyester made from dipropylene glycol (2.2 mol), phthalic anhydride (0.5 mol), adipic acid (0.5 mol), and maleic anhydride (1 mol).

The compositions shown in Tables 13 to 17 were prepared by mixing the polyester solution and the flame retarders, then adding 2 p.h.r. (based on the resin) of 50% methyl ethyl ketone peroxide (MEKP) catalyst. The mixture was poured into a 2.5×4.0×0.1 inch (63×100×2,5 mm) tray, a polyester film laid across the surface to exclude air, and cured at 60° for 20–24 hours. On removal from the tray, the resulting "tile" was then cut to 0.25"×0.100"×3" (6×76×2,5 mm), the size required for testing.

The results in Tables 13 to 17 show the effect in styrene cured polyester resin of using combinations of (a) and (b). Marked improvement in flame retardancy is observed over the comparative examples which contain no additive or only compound (a).

Table 13

Flame Retardant Tests in Styrene Cured Polyester Resin A

| Example No. | R | n | X | Method of Preparation | Parts of compound I | Phosphorus ester (parts) | Oxygen Index % |
|---|---|---|---|---|---|---|---|
| Comparative Example N[1] | — | — | — | — | — | — | 18.2 |
| O[1] | — | — | — | — | — | Tris(2,3-dibromopropyl)phosphate (25) | 21.6 |
| P[1] | — | — | — | — | — | Tris(2-chloroethyl)phosphate (25) | 24.2 |
| Q[1] | — | — | — | — | — | Trioctyl phosphate (25) | 20.2 |
| R[1] | — | — | — | — | — | Octyl diphenyl phosphate (25) | 19.9 |
| 80 | biphenyl | 2 | OH | D | 10 | Tris(2,3-dibromopropyl)phosphate (25) | 39.3 |
| 81 | biphenyl | 2 | OH | D | 10 | Tris(2-chloroethyl)phosphate (25) | 40.8 |
| 82 | biphenyl | 2 | OH | D | 10 | Trioctyl phosphate (25) | 30.3 |
| 83 | biphenyl | 2 | OH | D | 10 | Octyl diphenyl phosphate (25) | 22.9 |

Table 14.

Flame Retardant Test in Styrene Cured Polyester Resin A

| Example No. | Compound I | Molecular Weight | Method of Preparation | Parts of compound I | Phosphorus ester (Parts) | Oxygen Index % |
|---|---|---|---|---|---|---|
| 84 | Naphthalene oligomer | 550 | E | 10 | Tris(2-chloroethyl)phosphate (25) | 39.2 |
| 85 | Naphthalene oligomer | 380 | F | 10 | Tris(2-chloroethyl)phosphate (25) | 41.5 |
| Comparative Example S[1] | — | — | — | — | Tris(2-chloroethyl)phosphate (25) | 24.2 |
| 86 | Naphthalene oligomer | | E | 4 | Tris(2-chloroethyl)phosphate (5) | 25.4 |
| Comparative Example T[1] | — | — | — | — | Tris(2-chloroethyl)phosphate (5) | 21.6 |
| 87 | Naphthalene oligomer | 530 | G | 10 | Tris(2-chloroethyl)phosphate (25) | 35.0 |
| Comparative Example V[1] | — | — | — | — | Tris(2-chloroethyl)phosphate (25) | 24.2 |
| 88 | Naphthalene oligomer | 530 | G | 10 | Diphenyl ethyl phosphate (25) | 33.3 |

Table 14.-continued

Flame Retardant Test in Styrene Cured Polyester Resin A

| Example No. | Compound I | Molecular Weight | Method of Preparation | Parts of compound I | Phosphorus ester (Parts) | Oxygen Index % |
|---|---|---|---|---|---|---|
| V[1] | — | — | — | — | — | 23.0 |

Table 15.

Flame Retardant Test in Styrene Cured Polyester Resin A

| Example No. | Compound I | n | X | Method of preparation | Parts of Compound I | Phosphorus Ester (parts) | Oxygen Index % |
|---|---|---|---|---|---|---|---|
| Comparative Example 89 | biphenyl structure | 2 | OH | D | 4 | Tris-(2-chloroethyl) phosphate (5) | 24.5 |
| Comparative Example W[1] | — | — | — | — | — | Tris-(2-chloroethyl) phosphate (5) | 21.6 |
| 90 | biphenyl structure | 2 | OH | D | 10 | Diphenyl 2-trichloroethyl phosphate (25) | 31.0 |
| Comparative Example X[1] | — | — | — | — | — | Diphenyl 2-trichloroethyl phosphate (25) | 23.0 |
| 91 | biphenyl structure | 2 | OH | D | 10 | $[CH_3-C(CH_3)-C_6H_2Br_2-OP(O)(OCH_2CH_2Cl)_2]_2$ | 26.4 |
| Comparative Example Y[1] | — | — | — | — | — | " | 22.8 |
| 92 | biphenyl structure | 2 | OCH$_3$ | B | 10 | Triphenyl phosphate (25) | 27.6 |
| Comparative Example Z[1] | — | — | — | — | — | Triphenyl phosphate (25) | 21.4 |
| 93 | naphthalene structure | 2 | OH | D | 10 | Triphenyl phosphate (25) | 32.0 |
| 94 | biphenyl structure | 2 | OCH$_3$ | B | 10 | Tris(2-chloroethyl)phosphate (25) | 33.8 |
| 95 | biphenyl structure | 2 | Cl | A | 10 | Tris(2-chloroethyl)phosphate (25) | 26.3 |

Table 15.-continued

Flame Retardant Test in Styrene Cured Polyester Resin A

| Example No. | Compound I | n | X | Method of preparation | Parts of Compound I | Phosphorus Ester (parts) | Oxygen Index % |
|---|---|---|---|---|---|---|---|
| 96 | (methylnaphthalene structure) | 2 | OH | D | 10 | Tris(2-chloro-ethyl)phosphate (25) | 31.2 |
| 97 | (biphenyl structure) | 2 | OH | D | 10 | Tri-allyl phosphate (25) | 23.6 |
| Comparative Example A[2] | — | — | — | — | — | Tri-allyl phosphate (25) | 20.6 |
| 98 | (biphenyl structure) | 2 | OH | D | 5 | Tris(2,3-dibromo-propyl phosphate (10) | 28.5 |
| 99 | " | 2 | OH | D | 10 | Tris(2-chlor-ethyl) (5) | 26.6 |
| 100 | " | 2 | OH | D | 2 | Tris(2-chloro-ethyl) (13) | 33.3 |
| 101 | " | 2 | OH | D | 7.5 | Tris(2-chloro-ethyl) (7.5) | 28.4 |
| 102 | " | 2 | OH | D | 5 | Tris(2-chloro-ethyl) (10) | 31.9 |
| Comparative Example B[2] | — | — | — | — | — | Tris(2-chloro-ethyl) (5) | 21.6 |
| C[2] | — | — | — | — | — | Tris(2-chloro-ethyl) (10) | 22.4 |
| D[2] | — | — | — | — | — | Tris(2-chloro-ethyl) (15) | 23.0 |

Table 16

Flame Retardant Tests in Styrene Cured Polyester Resin A using a supplementary additive.

| Example No. | R | X | n | Method of preparation | Parts of Compound I | Phosphorus Ester (parts) | Additive (parts) | Oxygen Index % |
|---|---|---|---|---|---|---|---|---|
| 103 | (methylnaphthalene structure) | OH | 2 | D | 5 | Tris(2-chloro-ethyl)phosphate (25) | (naphthalene-CH$_2$OH structure) (5) | 28.8 |
| 104 | (biphenyl structure) | OH | 2 | D | 5 | Tris(2-chloro-ethyl)phosphate (25) | (biphenyl-CH$_2$OH structure) | 37.7 |

Table 17

Flame Retardant Tests in Styrene Cured Polyester Resin A using PVC as a filler

| Example No. | R | X | n | Method of preparation | Parts of Compound I | Phosphorus Ester (parts) | PVC (parts) | Stabiliser (parts) | Oxygen Index % |
|---|---|---|---|---|---|---|---|---|---|
| 105 |  | OH | 2 | D | 10 | Tris(2,3-dibromopropyl) phosphate (25) | 10 | Epoxidised Soya Bean Oil (2) | 32.0 |
| 106 | " | OH | 2 | D | 10 | Tris(2,3-dibromopropyl) phosphate (25) | 30 | Epoxidised Soya Bean Oil (2) | 34.0 |
| 107 | " | OH | 2 | D | 10 | Tris(2,3-dibromopropyl) phosphate (25) | 10 | Epoxidised Soya Bean Oil (2) | 31.8 |

EXAMPLES 108 TO 120

The following polyesters or esters were used:

Polyester B denotes a 70% solution in styrene of a polyester made from propylene glycol (3.15 mol), phthalic anhydride (2 mol), and maleic anhydride (1 mol).

Ester C denotes a 70% solution in styrene of 2,2-bis(4-(3-methacryloxy-2-hydroxypropoxy phenyl)propane.

Polyester D denotes a 70% solution in styrene of a polyester made from dipropylene glycol (2.2 mol), adipic acid (0.5 mol), 1,4,5,6,7,7-hexachlorobicyclo[2.2.1]hept-5-ene-2,3-dicarboxylic acid anhydride (0.5 mol) and maleic anhydride (1 mol).

Polyester E denotes a commercially available solution in styrene of an unsaturated polyester resin based on a 2,2-bis(4-(hydroxyalkoxy)phenyl)-propane.

Ester F denotes a 70% solution in 1,1,1-trimethylolpropane trimethacrylate of 2,2-bis(4-(3-methacryloxy-2-hydroxy-propoxy)phenyl)propane.

Ester G denotes an 83.3% solution in diallyl phthalate of 2,2-bis(4-(3-methacryloxy-2-hydroxypropoxy)-phenyl)propane.

The parts of (a) and (b) indicated in table 18 were mixed with 100 parts of the polyester solutions. Then the indicated parts of a siccative containing 8% cobalt and of the curing catalyst (a 60% dispersion of ethyl methyl ketone peroxide in dimethyl phthalate) were added. The mixtures were poured into a try as in examples 80–107, the curing however was carried out by steps.

Firstly the casting was allowed to gel overnight at room temperature, followed by heating for 1 hour to 50° C. and 1 hour to 80° C.

Table 18

Flame Retardant Tests in a Series of Polyester Resins

| Example No. | R | X | n | Method of Preparation | Parts of Compound I | Phosphorus Compound (parts) | Siccactive (parts) | Catalyst (parts) | Polyester/ Ester | Oxygen Index % |
|---|---|---|---|---|---|---|---|---|---|---|
| Comparative Example E[2] | — | — | — | — | — | Triphenyl phosphate (20) | 0.5 | 4 | B | 20.5 |
| 108 | 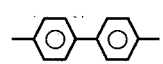 | OH | 2 | D | 10 | Triphenyl phosphate (20) | 0.5 | " | B | 24.5 |
| Comparative Example F[2] | — | — | — | — | — | Triphenyl phosphate (20) | 0.125 | " | C20 | |
| 109 | 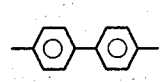 | OH | 2 | D | 10 | Triphenyl phosphate (20) | 0.125 | " | C | 29.5 |
| Comparative Example G[2] | — | — | — | — | — | Triphenyl phosphate (20) | 0.5 | " | D | 22.5 |

Table 18-continued

Flame Retardant Tests in a Series of Polyester Resins

| Example No. | R | X | n | Method of Preparation | Parts of Compound I | Phosphorus Compound (parts) | Sicc-active (parts) | Catalyst (parts) | Polyester/Ester | Oxygen Index % |
|---|---|---|---|---|---|---|---|---|---|---|
| 110 | —⟨○⟩—⟨○⟩— | OH | 2 | D | 10 | Triphenyl phosphate (20) | 0.5 | " | D | 24.0 |
| 111 | —⟨○⟩—⟨○⟩— | OCH₃ | 2 | C | 10 | Triphenyl phosphate (20) | 0.5 | " | D | 26.5 |
| 112 | [⟨○⟩—OCH₂—CHCH₂OCH₂CH₂— / OH]₂ | OH | 2 |  | 10 | Triphenyl phosphate (20) | 0.5 | " | D | 30.0 |
| Comparative Example H² | — | — | — | — | — | Triphenyl phosphate (20) | 0.5 | " | E | 22.8 |
| 113 | —⟨○⟩—⟨○⟩— | OCH₃ | 2 | B | 10 | Triphenyl phosphate (20) | 0.5 | " | E | 24.1 |
| Comparative Example K² | — | — | — | — | — | 20 | 0.5 | " | F | 23.5 |
| 114 | —⟨○⟩—⟨○⟩— | OCH₃ | 2 | B | 10 | " | 0.5 | " | F | 31.5 |
| 115 | —⟨○⟩—⟨○⟩— | OH | 2 | D | 10 | " | 0.5 | " | F | 32.5 |
| 116 | [⟨○⟩—OCH₂CHCH₂OCH₂CH₂— / OH]₂ | OH | 2 |  | 10 | " | 0.5 | " | F | 31.0 |
| Comparative Example L² | — | — | — | — | — | " | 0.5 | " | G | 20.5 |
| 117 | —⟨○⟩—⟨○⟩— | OCH₃ | 2 | B | 10 | " | 0.5 | " | G | 29.0 |
| 118 | —⟨○⟩—⟨○⟩— | OH | 2 | D | 10 | Triphenyl Phosphine Oxide (20) | 0.5 | " | B | 21.3 |
| Comparative Example M² | — | — | — | — | — | Triphenyl phosphine Oxide (20) | " | " | B | 18.5 |
| 119 | | OH | 2 | D | 10 | Diammonium hydrogen phosphate (20) | " | " | B | 21.0 |
| Comparative Example N² | — | — | — | — | — | Diammonium hydrogen phosphate | " | " | B | 16.4 |

Table 18-continued

| | | | | | Flame Retardant Tests in a Series of Polyester Resins | | | | |
|---|---|---|---|---|---|---|---|---|---|
| Example No. | R | X | n | Method of Preparation | Parts of Compound I | Phosphorus Compound (parts) | Siccactive (parts) | Catalyst (parts) | Polyester/ Ester | Oxygen Index % |
| | | | | | (20) | | | | |

What we claim is:

1. A composition which comprises a polymer selected from the group consisting of
   (1) a homopolymer or copolymer of styrene or α-methyl styrene,
   (2) a blend of (1) with polyphenylene oxide, polysulfone, vinyl chloride resin or polycarbonate,
   (3) a styrene cured unsaturated polyester resin, and
   (4) a polymer containing an aromatic group in the polymer chain and selected from the group consisting of polycarbonates, polyphenylene ethers, polysulfides, polyurethanes, polyhydrazides, linear polyesters, polysulfonates, polyamides, polyimides, polybenzimidazoles and polyanhydrides, and a flame-retarding combination of
   (a) a phosphorus compound selected from the group consisting of a phosphine oxide, a phosphorous oxy acid, a salt of a phosphorous oxy acid and an ester of a phosphorous oxy acid, and
   (b) a compound of the formula $$R(CH_2X)_n$$

wherein
R represents a monocyclic aromatic hydrocarbon radical or a di- or polycyclic-aromatic hydrocarbon radical the rings of which are fused or are linked directly and wherein R is unsubstituted other than by $(CH_2X)$ or is substituted by one or more groups selected from alkyl of 1 to 12 carbon atoms, cycloalkyl of 5 to 12 carbon atoms, hydroxyl, alkoxy of 1 to 12, alkoxy of 1 to 12 carbon atoms which contains an epoxide group, cycloalkoxy of 5 to 12 carbon atoms, aralkyloxy of 7 to 12 carbon atoms, acyloxy of 1 to 12 carbon atoms, carboxyl and carboalkoxy of 2 to 12 carbon atoms, n is an integer of 2 to 12, and X is OH.

2. A composition according to claim 1 wherein component (a) is an ester of a phosphorus oxy acid.

3. A composition according to claim 1 wherein the amount of component (a) plus component (b) is from 1 to 100 parts by weight per 100 parts of polymer.

4. A composition according to claim 3 wherein the amount of component (a) plus component (b) is from 2 to 35 parts by weight per 100 parts of polymer.

5. A composition according to claim 1 wherein the ratio of component (a) to component (b) is from 1:10 to 10:1 by weight.

6. A composition according to claim 5 wherein the ratio is from 1:1 to 8:1.

7. A composition according to claim 5 wherein the ratio is from 2:1 to 4:1 by weight.

8. A composition according to claim 1 wherein the polymer is a homopolymer or copolymer of styrene or α-methyl styrene.

9. A composition according to claim 1 wherein the polymer is a copolymer of styrene with butadiene or butadiene/acrylonitrile.

10. A composition according to claim 1 wherein the polymer is a copolymer of styrene and an unsaturated polyester.

11. A composition according to claim 1 wherein the component (a) is an ester derived from phosphoric acid, phosphorus acid, a phosphonic acid, or a phosphinic acid.

12. A composition according to claim 11 wherein component (a) is an ester of an acid containing pentavalent phosphorus.

13. A composition according to claim 11 wherein the ester is a triaryl phosphate or tri-haloalkyl phosphate.

14. A composition according to claim 1 wherein component (a) is a phosphine oxide.

15. A composition according to claim 14 wherein component (a) is a triaryl phosphine oxide.

16. A composition according to claim 1 wherein component (a) is a salt of a phosphorus acid.

17. A composition according to claim 16 wherein component (a) is an alkali metal, ammonium or amine salt of phosphoric acid, phosphorous acid, a phosphonic or a phosphinic acid.

18. A composition according to claim 1 additionally containing a heat stabilizer, light stabilizer, UV absorber, antioxidant, filler, pigment, lubricant, blowing agent, fungicide, additive to improve mould release, optical brightening agent or other fire retardant additive.

19. A composition as claimed in claim 1 in which the component (a) is a derivative or a salt of a phosphorus acid or a phosphine oxide.

20. A composition as claimed in claim 1 in which the polymer is polystyrene or a blend of polystyrene with another polymer.

21. A composition as claimed in claim 1 in which the polymer is a copolymer of styrene with butadiene or with butadiene/acrylonitrile.

22. A composition as claimed in claim 1 in which the polymer is a copolymer of styrene and an unsaturated polyester.

23. A composition as claimed in claim 1 in which the polymer is a polycarbonate based on 2,2-bis (4-hydroxyphenyl)propane or its polyblend with other polymers.

24. A composition as claimed in claim 1 in which the polymer is a linear polyester derived from phthalic, terephthalic or isophthalic acid, a maleic acid and a glycol.

25. A composition as claimed in claim 1 in which the polymer is poly-2,6-dimethyl-1,4-phenylene oxide or its polyblend with other polymers.

26. A composition as claimed in claim 1 in which the polymer is a polyurethane based on adipic acid, 1,4-butane diol and 4,4'-diphenyl methane di-isocyanate.

27. A composition as claimed in claim 1 in which (b) is a compound of the formula

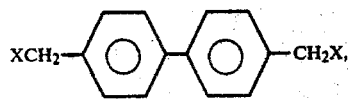
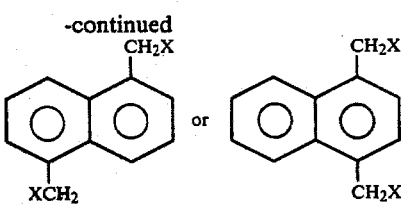
where X represents OH.
* * * * *